United States Patent
Suga et al.

(10) Patent No.: US 9,348,208 B2
(45) Date of Patent: May 24, 2016

(54) PROJECTOR HAVING A LIGHT-EMITTING ELEMENT, IMAGE FORMING UNIT AND REFLECTING MEMBER

(75) Inventors: Akinobu Suga, Tokyo (JP); Takayuki Uchiyama, Yokohama (JP); Nobuhiro Fujinawa, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 61 days.

(21) Appl. No.: 12/812,523

(22) PCT Filed: Nov. 10, 2008

(86) PCT No.: PCT/JP2008/070427
§ 371 (c)(1),
(2), (4) Date: Jul. 12, 2010

(87) PCT Pub. No.: WO2009/093369
PCT Pub. Date: Jul. 30, 2009

(65) Prior Publication Data
US 2010/0290008 A1    Nov. 18, 2010

(30) Foreign Application Priority Data

Jan. 22, 2008   (JP) ................. 2008-011480
Feb. 13, 2008   (JP) ................. 2008-032057
Jun. 18, 2008   (JP) ................. 2008-159147

(51) Int. Cl.
*G03B 21/20*     (2006.01)
*G03B 21/28*     (2006.01)

(52) U.S. Cl.
CPC ............ *G03B 21/28* (2013.01); *G03B 21/2066* (2013.01); *G03B 21/208* (2013.01); *G03B 21/2073* (2013.01)

(58) Field of Classification Search
CPC ............... G03B 21/28; G03B 21/2066; G03B 21/2073; G03B 21/208
USPC ........... 353/33, 81, 88, 89, 90, 91, 92, 93, 97
See application file for complete search history.

(56) References Cited

U.S. PATENT DOCUMENTS

| 5,721,050 A  | 2/1998 | Roman et al. |
| 6,583,940 B2 * | 6/2003 | Nishikawa et al. ........... 359/738 |

(Continued)

FOREIGN PATENT DOCUMENTS

| JP | A-3-63690 | 3/1991 |
| JP | A-3-187696 | 8/1991 |

(Continued)

OTHER PUBLICATIONS

International Search Report dated Feb. 17, 2009 for corresponding International Application No. PCT/JP2008/070427.

(Continued)

*Primary Examiner* — Bao-Luan Le
(74) *Attorney, Agent, or Firm* — Oliff PLC

(57) ABSTRACT

A projector includes: a solid-state light emitting element that emits light; a projection image forming unit that includes an effective area in order to form a projection image; and a reflecting member disposed between the solid-state light emitting element and the projection image forming unit, wherein: the reflecting member reflects part of the light emitted from the solid-state light emitting element and thus redirects the part of the light to travel back to the solid-state light emitting element, the part of the light not entering the effective area.

5 Claims, 24 Drawing Sheets

(56) References Cited

U.S. PATENT DOCUMENTS

Figure 1:
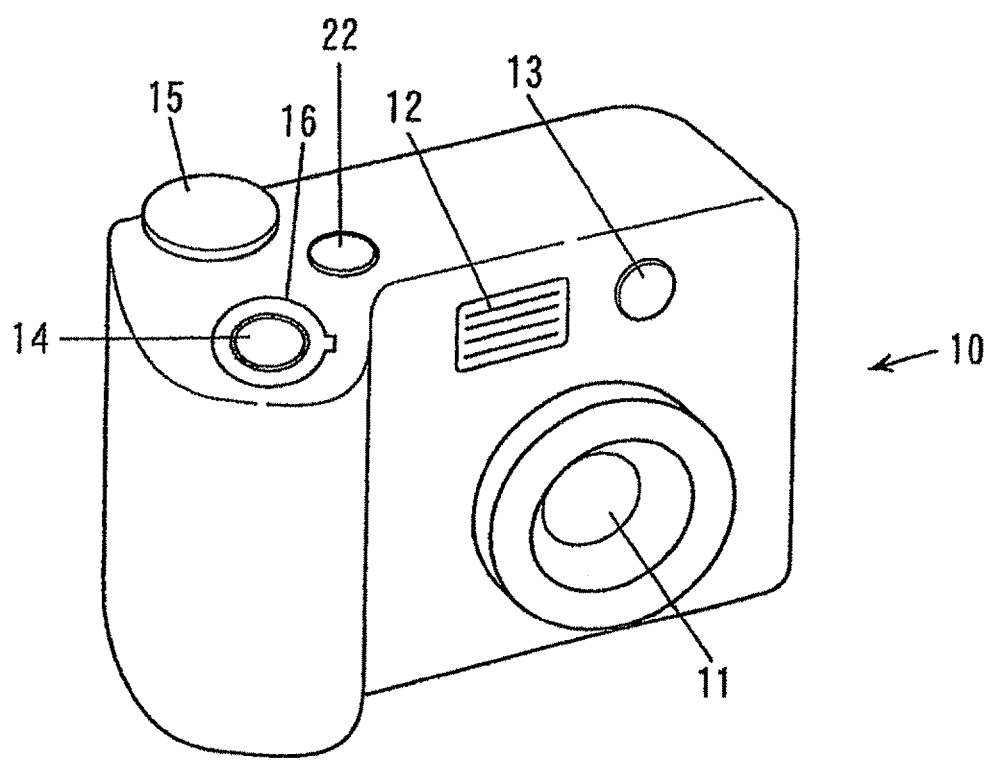

| | | | |
|---|---|---|---|
| 7,959,305 B2* | 6/2011 | Destain | 353/99 |
| 2004/0066492 A1* | 4/2004 | Nakashima et al. | 353/20 |
| 2005/0007554 A1 | 1/2005 | Lee | |
| 2005/0219476 A1* | 10/2005 | Beeson et al. | 353/98 |
| 2005/0280785 A1* | 12/2005 | Beeson et al. | 353/97 |
| 2006/0203468 A1* | 9/2006 | Beeson et al. | 362/84 |
| 2006/0221310 A1* | 10/2006 | Kim et al. | 353/99 |
| 2006/0227302 A1* | 10/2006 | Harbers et al. | 353/94 |
| 2007/0024825 A1* | 2/2007 | Stephanes | 353/98 |
| 2007/0146639 A1* | 6/2007 | Conner | 353/20 |
| 2007/0211217 A1* | 9/2007 | Ma et al. | 353/20 |
| 2009/0009730 A1* | 1/2009 | Destain | 353/84 |
| 2010/0091118 A1 | 4/2010 | Fujinawa | |

FOREIGN PATENT DOCUMENTS

| | | |
|---|---|---|
| JP | 05-142653 | 6/1993 |
| JP | A-10-221640 | 8/1998 |
| JP | A-11-64795 | 3/1999 |
| JP | A-11-160670 | 6/1999 |
| JP | A-11-260142 | 9/1999 |
| JP | A-2000-347294 | 12/2000 |
| JP | A-2001-114404 | 4/2003 |
| JP | A-2004-327361 | 11/2004 |
| JP | 2004-354495 | 12/2004 |
| JP | A-2004-354880 | 12/2004 |
| JP | A-2005-31677 | 2/2005 |
| JP | B2-3660371 | 6/2005 |
| JP | A-2005-326575 | 11/2005 |
| JP | A-2006-154601 | 6/2006 |
| JP | 2006-227244 | 8/2006 |
| JP | A-2006-243433 | 9/2006 |
| JP | A-2006-301620 | 11/2006 |
| JP | 2007-072392 | 3/2007 |
| JP | A-2007-72241 | 3/2007 |
| JP | A-2007-110142 | 4/2007 |

OTHER PUBLICATIONS

Jan. 29, 2013 Office Action issued in Japanese Patent Application No. 2008-159147 (with Translation).

Dec. 11, 2012 Office Action issued in Japanese Patent Application No. 2008-032057 (with Translation).

Jun. 26, 2012 Office Action issued in Japanese Patent Application No. 2008-159147 (with translation).

* cited by examiner

FIG.5
(a) 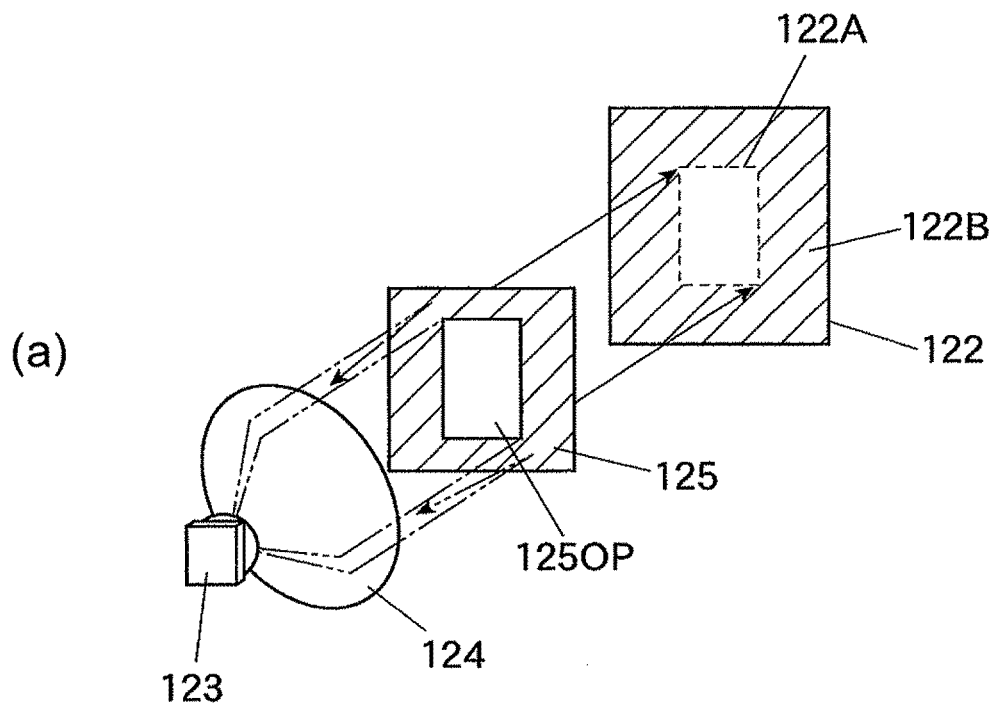
(b) 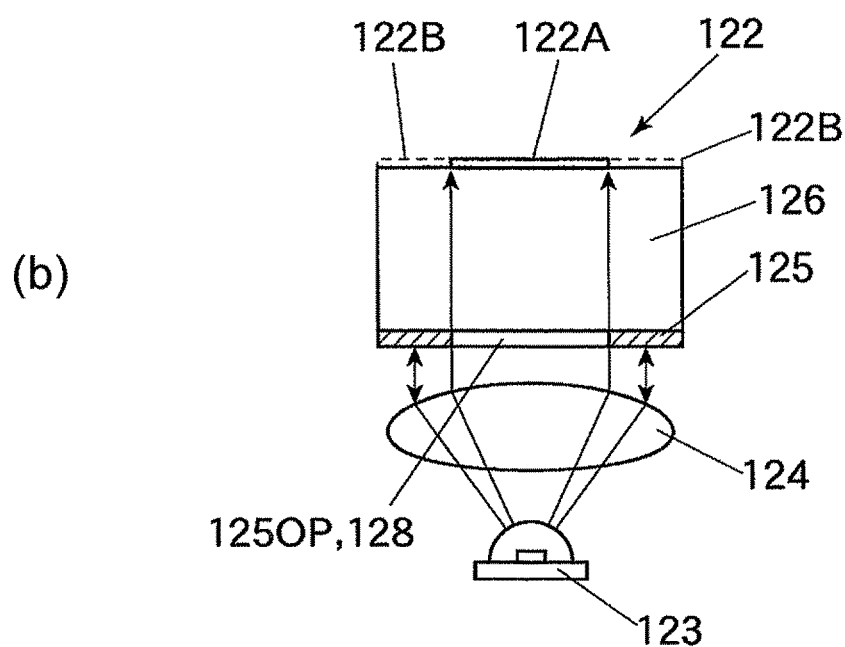

FIG.7
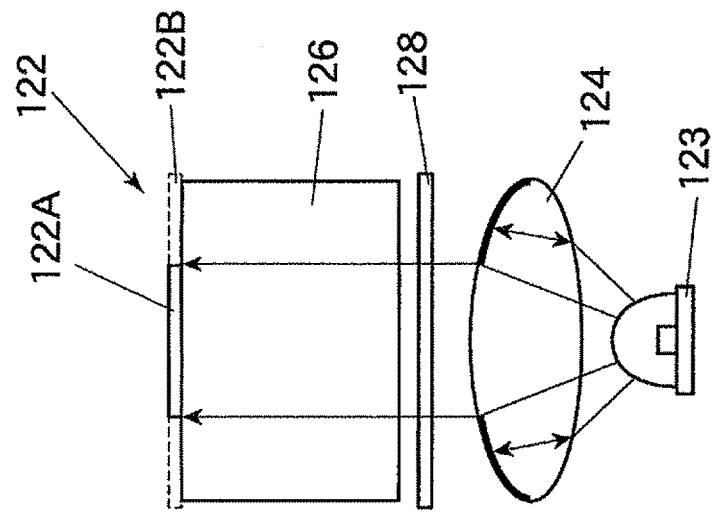
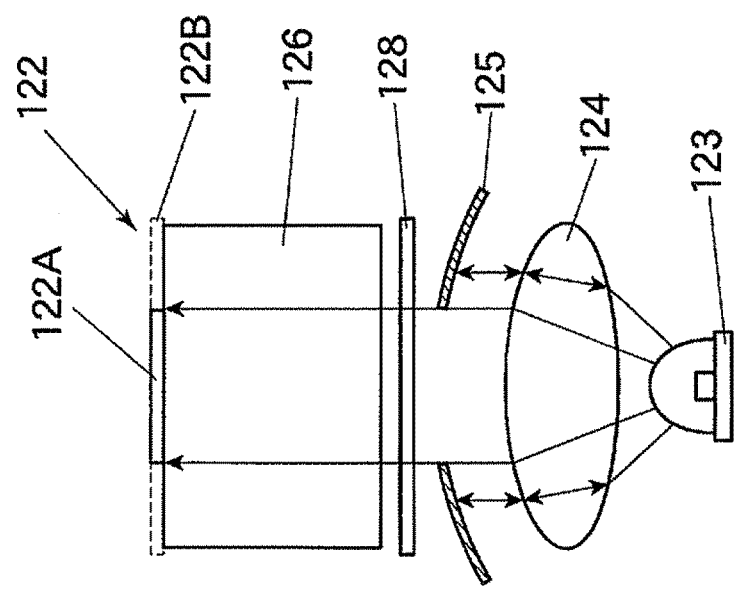

FIG.14
(a)
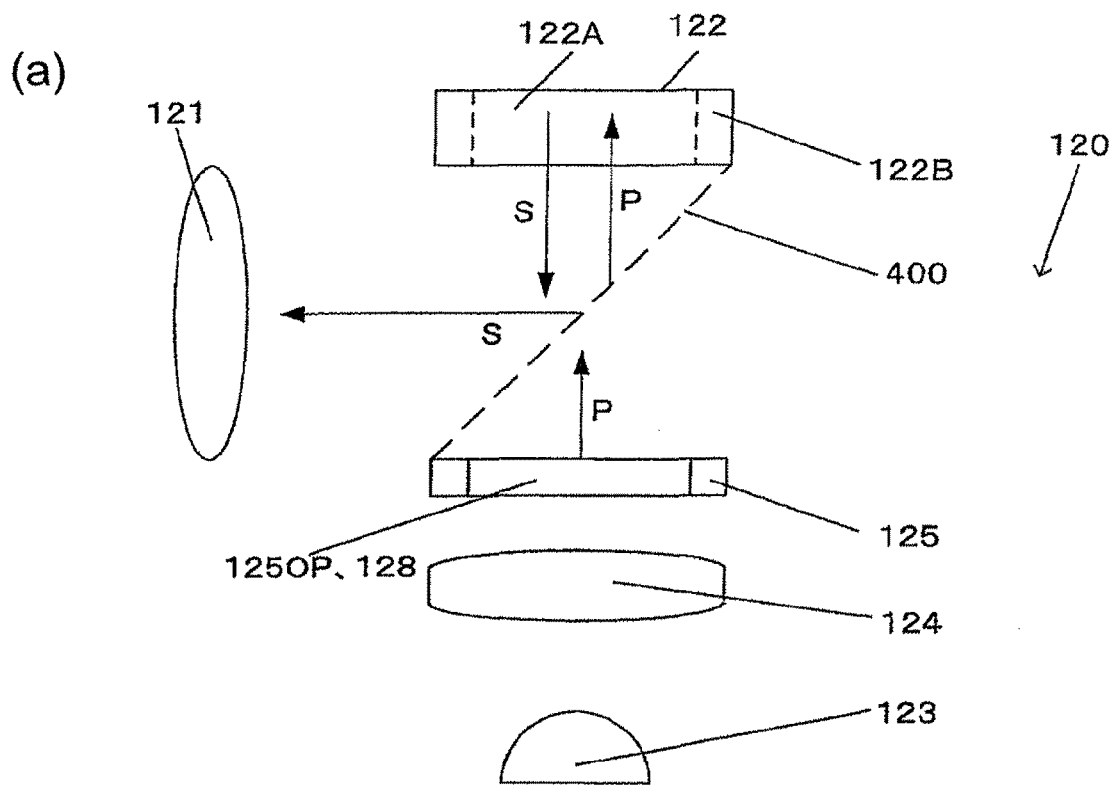
(b)
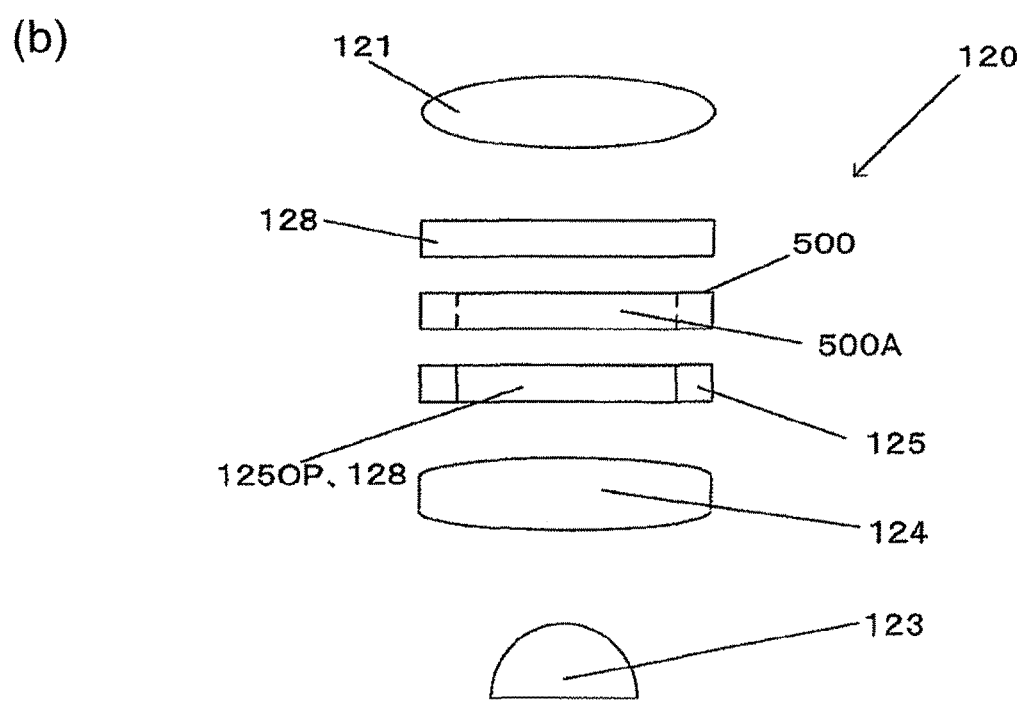

PROJECTOR HAVING A LIGHT-EMITTING ELEMENT, IMAGE FORMING UNIT AND REFLECTING MEMBER

TECHNICAL FIELD

The present invention relates to a projector.

BACKGROUND ART

The portion of illuminating light emitted from a light source, which would otherwise illuminate an ineffective area outside the display range of a liquid crystal panel may be reflected at a reflector plate in order to ensure efficient utilization of the illuminating light at an image display device known in the related art (see, for instance, patent reference 1).

In addition, projectors in the related art split light originating from a light source into two polarized light beams perpendicular to each other via a polarization splitter and use only one of the polarized light beams for projection (see, for instance, patent reference 2). In this case, only half of the light initially emitted from the light source is used for projection, and accordingly, illumination devices attempting to improve the utilization efficiency with which the light from the light source is utilized have been proposed (see, for instance, patent reference 3).
Patent reference 1: Japanese Patent No. 3660371
Patent reference 2: Japanese Laid Open Patent Publication No. 2007-72241
Patent reference 3: Japanese Laid Open Patent Publication No. 2006-243433

DISCLOSURE OF THE INVENTION

Problems to be Solved by the Invention

There is an issue to be addressed with regard to the utilization of the illuminating light reflected off the reflector plate in that since it is subsequently reflected within an optical system disposed between the light source and the liquid crystal and then illuminates the liquid crystal, the display range is illuminated with uneven illuminating light. In addition, a projector configured by using any of the devices described above will require numerous additional parts, which is bound to increase the overall size of the device and raise the production cost.

According to the 1st aspect of the present invention, a projector comprises: a solid-state light emitting element that emits light; a projection image forming unit that includes an effective area in order to form a projection image; and a reflecting member disposed between the solid-state light emitting element and the projection image forming unit, wherein: the reflecting member reflects part of the light emitted from the solid-state light emitting element and thus redirects the part of the light to travel back to the solid-state light emitting element, the part of the light not entering the effective area.

According to the 2nd aspect of the present invention, it is preferred that in the projector according to the 1st aspect, the solid-state light emitting element includes a light emitting portion and a phosphorescent substance, emits the light that includes excitation light originating from the light emitting portion and phosphorescent light emanating from the phosphorescent substance, and emits the phosphorescent light toward the effective area by exciting the phosphorescent substance with the light reflected at the reflecting member.

According to the 3rd aspect of the present invention, it is preferred that in the projector according to the 1st or the 2nd aspect, the reflecting member includes an opening formed in a shape corresponding to a shape of the effective area; and the solid-state light emitting element emits the light toward the projection image forming unit via the opening.

According to the 4th aspect of the present invention, it is preferred that in the projector according to the 1st or the 2nd aspect, the reflecting member includes a first reflecting portion and a second reflecting portion which are set apart from each other over a predetermined distance corresponding to the effective area.

According to the 5th aspect of the present invention, it is preferred that the projector according to any one of the 1st through the 4th aspects further comprises: an illumination optical system that guides the light emitted from the solid-state light emitting element to the projection image forming unit, wherein: the reflecting member is disposed at a side of the solid-state light emitting element relative to the illumination optical system.

According to the 6th aspect of the present invention, it is preferred that in the projector according to any one of the 1st through the 5th aspects, the solid-state light emitting element includes a dome-shaped cover member; and the reflecting member is disposed at a surface of the cover member.

According to the 7th aspect of the present invention, it is preferred that the projector according to any one of the 1st through the 6th aspects further comprises: a polarizer, wherein: the reflecting member is disposed at a side of the solid-state light emitting element relative to the polarizer.

According to the 8th aspect of the present invention, it is preferred that in the projector according to the 1st aspect, the projection image forming unit is a reflective image forming element that includes a polarization beam splitter disposed at a front thereof; and the reflecting member is disposed at an entry surface of the polarization beam splitter.

According to the 9th aspect of the present invention, a projector comprises: a light source; an illumination optical system that condenses light originating from the light source; a polarization splitter element that splits the light into a first light flux constituted with a first polarized light component and a second light flux constituted with a second polarized light component and outputs the first light flux and the second light flux, the light having been condensed at the illumination optical system and having entered at the polarization splitter element; a reflective display element that modulates the first light flux constituted with the first polarized light component having entered thereat to a third light flux constituted with the second polarized light component in correspondence to a display image and outputs the third light flux to the polarization splitter element; a projection optical system that projects a projection image obtained by optically analyzing, via the polarization splitter element, the third light flux constituted with the second polarized light component having resulted from modulation executed at the reflective display element; and a first reflecting member that reflects the second light flux constituted with the second polarized light component and thus redirects the second light flux to travel back to the light source via the polarization splitter element, wherein: the first polarized light component and the second polarized light component extend perpendicular to each other.

According to the 10th aspect of the present invention, it is preferred that in the projector according to the 9th aspect, the first reflecting member assumes reflection characteristics whereby the second light flux constituted with the second polarized light component having been reflected thereat travels backward through an optical path along which the second light flux has traveled prior to reflection.

According to the 11th aspect of the present invention, it is preferred that in the projector according to the 9th aspect, the first reflecting member assumes reflection characteristics whereby the second light flux constituted with the second polarized light component having been reflected travels back to a center of the light source.

According to the 12th aspect of the present invention, it is preferred that in the projector according to any one of the 9th through the 11th aspects, the first reflecting member and the polarization splitter element are set apart from each other over a distance greater than a critical entry distance assumed by unsplit light in the light when the unsplit light reaches the reflective display element, the light having originated from the light source and having entered the polarization splitter element, and the unsplit light entering the first reflecting member without undergoing polarization splitting at the polarization splitter element.

According to the 13th aspect of the present invention, it is preferred that the projector according to the 12th aspects further comprises: a shielding member that prevents the unsplit light from advancing toward an outside through an area present between the first reflecting member and the polarization splitter element.

According to the 14th aspect of the present invention, it is preferred that in the projector according to any one of the 9th through the 13th aspects, the first reflecting member reflects light at a predetermined wavelength.

According to the 15th aspect of the present invention, it is preferred that the projector according to the 14th aspect further comprises: a 714 wave plate corresponding to a wavelength within a predetermined wavelength range, disposed between the illumination optical system and the polarization splitter element.

According to the 16th aspect of the present invention, it is preferred that the projector according to any one of the 9th through the 15th aspects further comprises: a polarizer that allows a light flux constituted with the second polarized light component to be transmitted through and absorbs a light flux constituted with the first polarized light component, wherein: the polarizer is disposed at least one of between the polarization splitter element and the projection optical system, and between the polarization splitter element and the first reflecting member.

According to the 17th aspect of the present invention, it is preferred that the projector according to any one of the 9th through the 16th aspects further comprises: a second reflecting member that reflects part of the light emitted from the light source and redirects the part of the light to travel back to the light source, the part of the light not entering the illumination optical system.

According to the 18th aspect of the present invention, it is preferred that in the projector according to the 17th aspect, the second reflecting member includes a surface having a predetermined curvature.

According to the 19th aspect of the present invention, it is preferred that in the projector according to the 18th aspect, the second reflecting member assumes reflection characteristics whereby light reflected thereat travels back toward the center of the light source.

According to the 20th aspect of the present invention, it is preferred that in the projector according to any one of the 17th through the 19th aspects, the reflective display element includes an effective area in order to form a projection image, wherein: the light source is constituted with a solid-state light emitting element that includes a light emitting portion and a phosphorescent substance, and emits light that includes light originating from the light emitting portion and phosphorescent light emanating from the phosphorescent substance excited with light from the light emitting element; the second reflecting member reflects light which would not enter the effective area toward the light source; and the solid-state light emitting element excites the phosphorescent substance with the light having been reflected by the second reflecting member and emits phosphorescent light toward the effective area.

According to the 21th aspect of the present invention, it is preferred that in the projector according to any one of the 17th through the 20th aspects, the second reflecting member reflects light in a predetermined wavelength range.

Effect of the Invention

According to the present invention, the light that would otherwise not enter the effective area is redirected to travel back to the solid-state light emitting element and, as a result, it is possible to ensure that only uniform light is allowed to enter the projection image forming unit. Furthermore, improved utilization efficiency of the light from the light source is achieved while keeping down the bulk of the device and the production cost.

Figure 2:
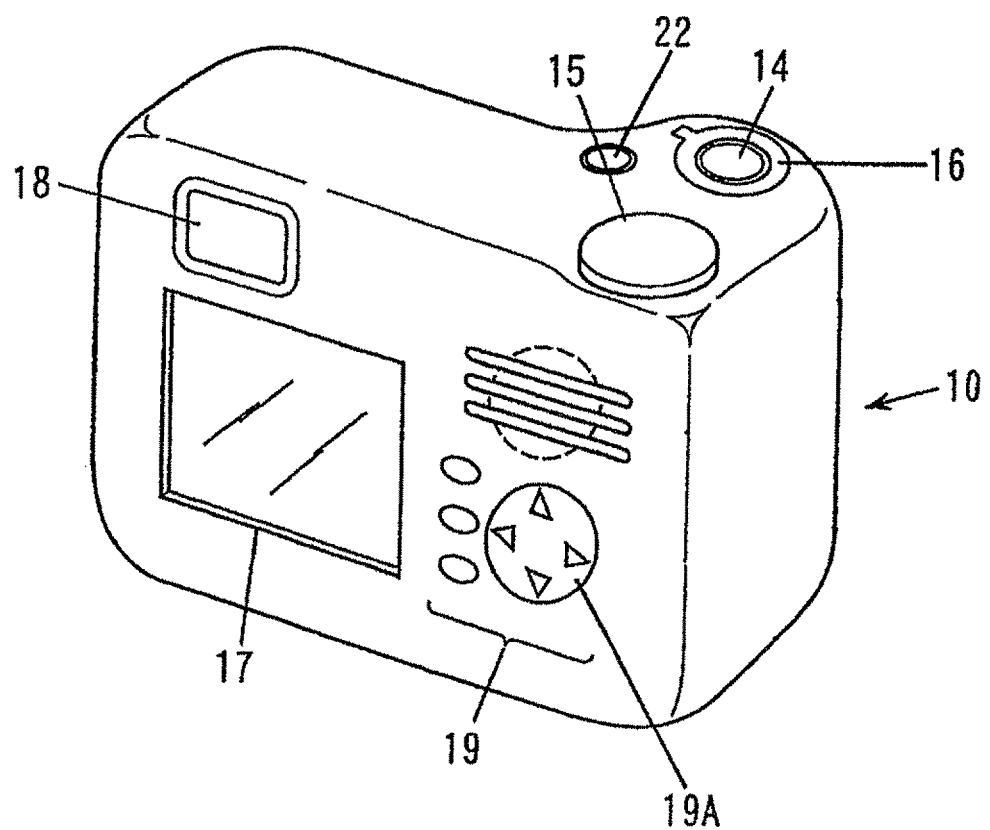
Figure 9:
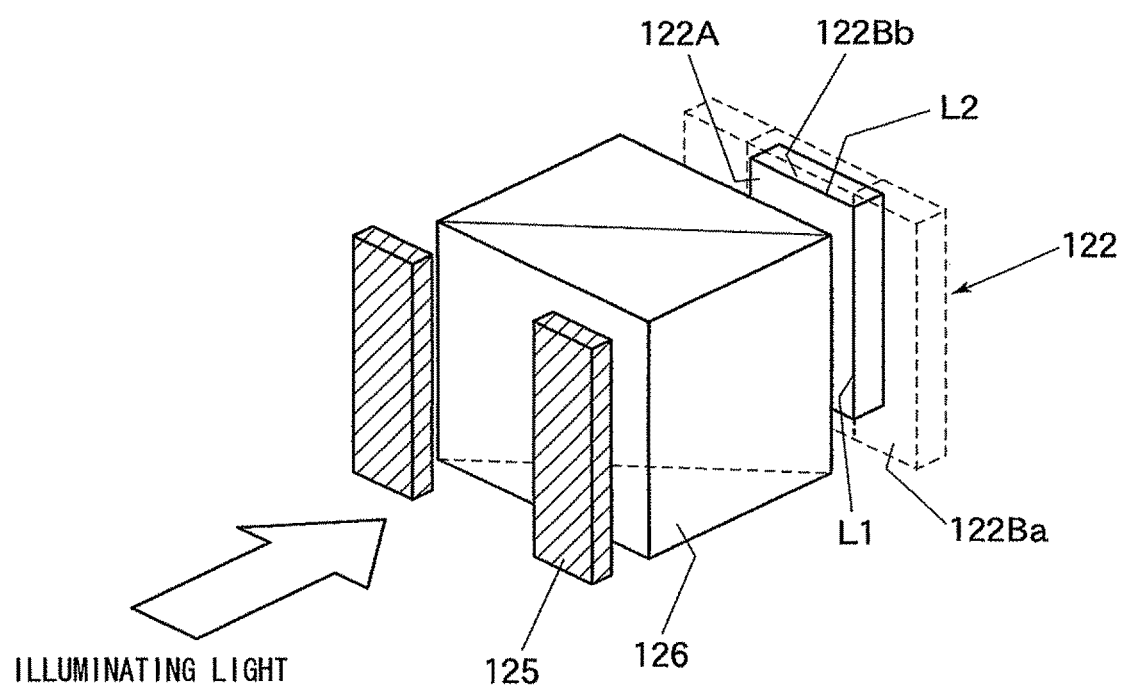
Figure 12:
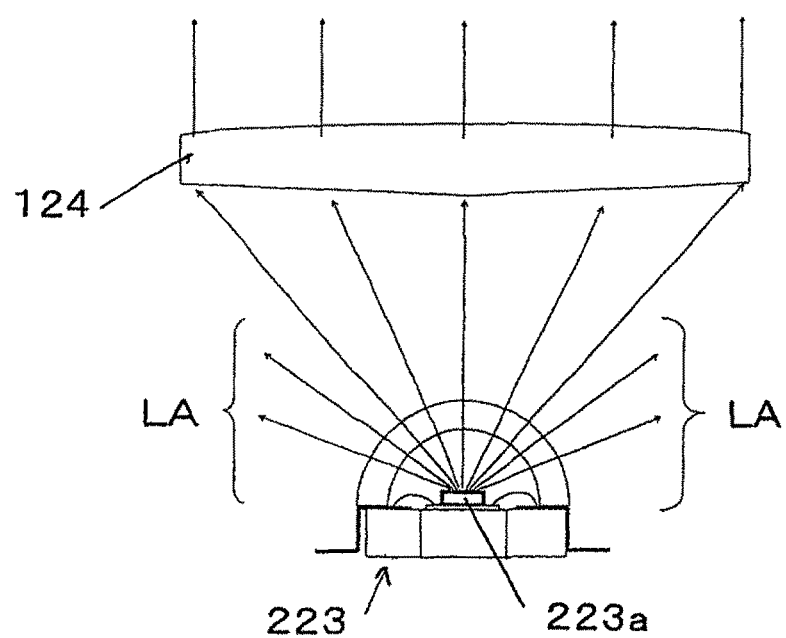
Figure 18:
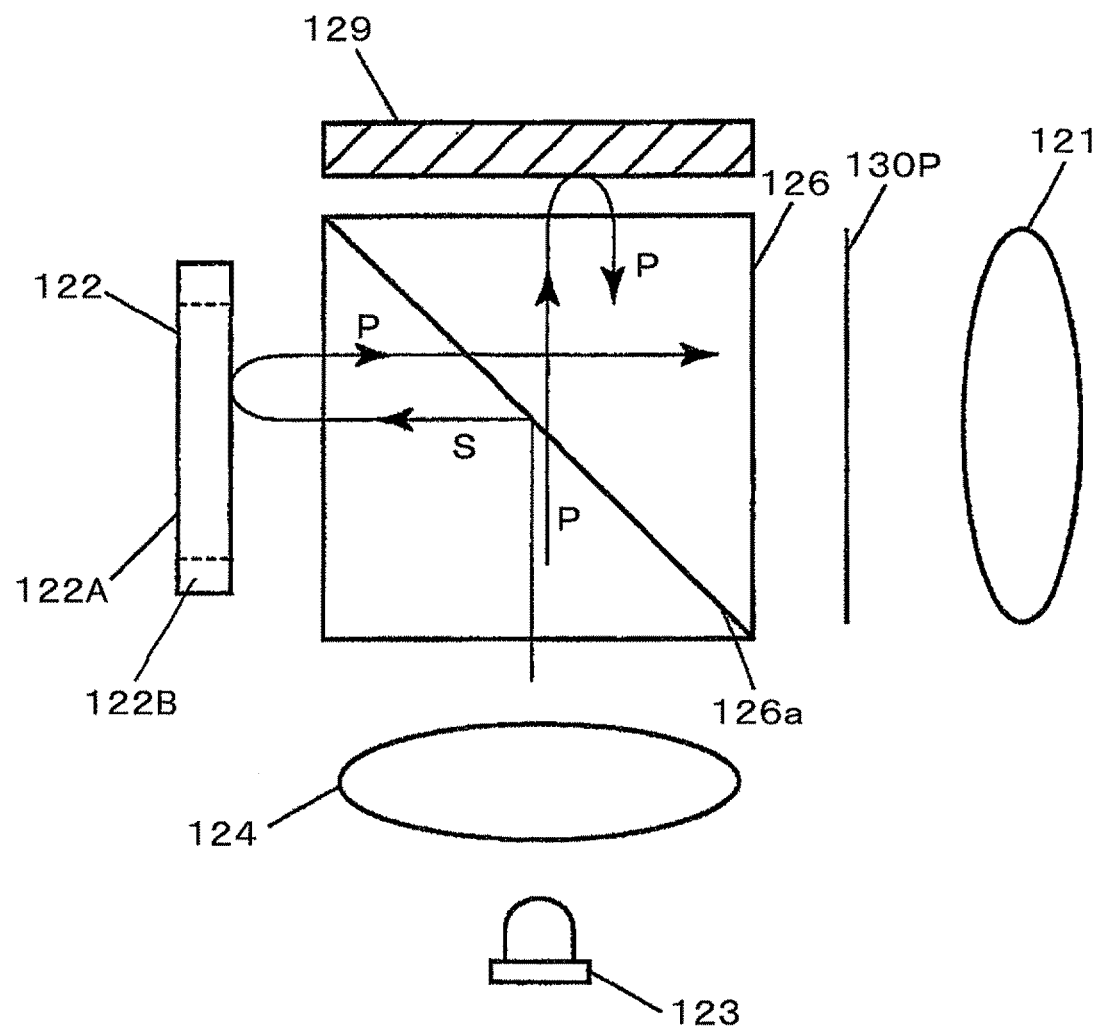

BRIEF DESCRIPTION OF THE DRAWINGS (FIG. 1) A perspective showing the front side of the projector-equipped electronic camera achieved in an embodiment of the present invention;

(FIG. 2) A perspective showing the rear side of the projector-equipped electronic camera achieved in the embodiment;

(FIG. 3) A block diagram showing the structure adopted in the projector-equipped electronic camera achieved in the embodiment;

(FIG. 4) The structure adopted in the projector unit in a first embodiment;

(FIG. 5) Schematic illustrations of the positional arrangement assumed in the projector unit in the first embodiment;

(FIG. 6) The structure of the LED light source at the projector unit achieved in the first embodiment;

(FIG. 7) The structures of projector units achieved as variations;

(FIG. 8) The structures of projector units achieved as variations;

(FIG. 9) The structure of a projector unit achieved as a variation;

(FIG. 10) The structure adopted in the projector unit in a second embodiment;

(FIG. 11) The structure of the LED light source at the projector unit achieved in the second embodiment;

(FIG. 12) A structure that may be assumed around a light source in the related art;

(FIG. 13) The structure of a light source achieved as a variation;

(FIG. 14) The structures of projector units achieved as variations;

(FIG. 15) The structure adopted in the projector unit in a third embodiment;

(FIG. 16) An illustration of a test conducted to verify an improvement in the light quantity;

(FIG. 17) Measurement results obtained via a spectrophotometer;

(FIG. 18) A first variation;

(FIG. 19) A second variation;

(FIG. 20) A third variation;

(FIG. 21) A fourth variation;

(FIG. 22) A fifth variation;
(FIG. 23) A sixth variation;
(FIG. 24) An eighth variation;

BEST MODE FOR CARRYING OUT THE INVENTION

—First Embodiment—

In reference to drawings, a projector-equipped electronic camera with the projector achieved in the first embodiment of the present invention, is described. As shown in FIG. 1, the projector equipped electronic camera 10 (hereafter referred to as the electronic camera 10) includes a photographic lens 11, an illuminating light window 12 and a projection window 13 disposed on the front side thereof. At the upper surface of the electronic camera 10, a shutter release button 14, a zoom switch 16, a mode selector dial 15 and a main switch 22 are disposed. In addition, a liquid crystal display unit 17, an electronic viewfinder 18 and a cross key 19 are disposed on the rear side of the electronic camera 10.

A projector (projector unit) to be detailed later is mounted at the electronic camera 10. Information such as an image can be projected from the electronic camera 10 through the projection window 13 toward a screen or the like installed to the front of the electronic camera 10 placed on, for instance, a desktop The mode selector dial 15 is a mode selection operation member via which a specific operating mode, such as a photographing mode or a projection mode can be selected for the electronic camera 10. When the photographing mode is selected as the operating mode, a subject image is captured and the image data expressing the captured image are saved as a photographic image file into a recording medium constituted of a memory card or the like.

When the projection mode is selected as the operating mode, a reproduced image is projected by the projector unit through the projection window 13 based upon image data expressing a previously photographed image, which may be read out from, for instance, a recording medium (e.g., a memory card 200 to be described later or an internal memory (not shown)). It is to be noted that in the projection mode, the projector unit may project a reproduced image based upon image data read out from a source other than the recording medium or image data provided from an external device outside located the electronic camera 10.

Figure 3:
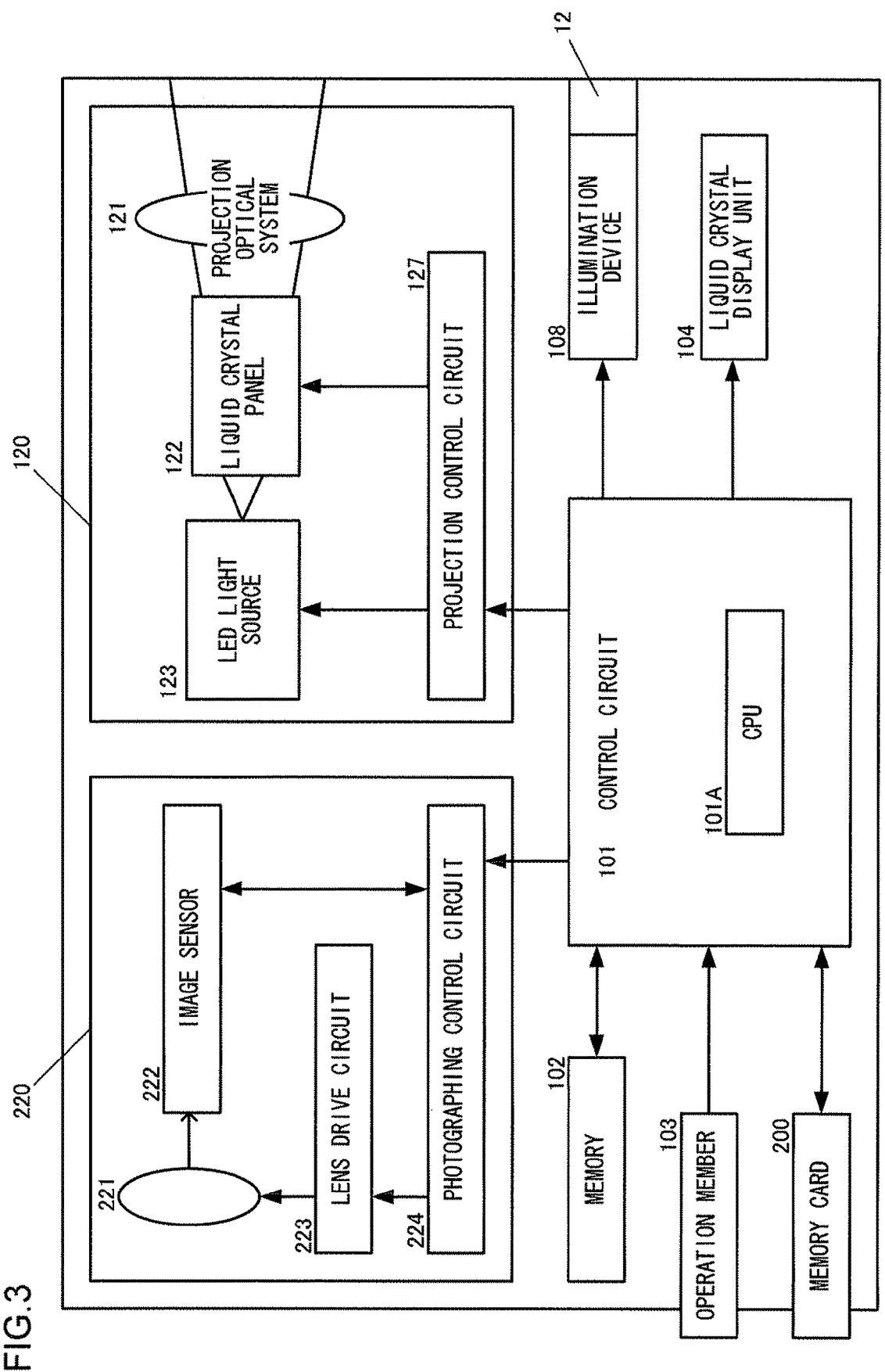

FIG. 3 is a block diagram showing the structure adopted in the electronic camera 10 described above. The electronic camera 10 in FIG. 3 includes a projector unit 120, an imaging unit 220, a memory 102, an operation member 103, a liquid crystal display unit 104 and an illumination device 108. A detachable memory card 200 is loaded in a card slot (not shown) at a control circuit 101 constituted with a CPU 101A and the like.

The CPU 101A executes predetermined arithmetic operations based upon a control program by using signals input thereto from various units constituting the electronic camera 10. Then, the CPU 101A controls photographing operations and projection operations by outputting control signals for the individual units in the electronic camera 10 based upon the arithmetic operation results. It is to be noted that the control program is stored in a non-volatile memory (not shown) within the CPU 101A.

The memory 102 is used as a work memory by the CPU 101A. The operation member 103 corresponds to the main switch 22, the shutter release button 14, the zoom switch 16 and the mode selector dial 15 in FIG. 1 and the cross key 19 in FIG. 2. The operation member 103 outputs to the CPU 101A an operation signal corresponding to specific operational details.

The memory card 200 is constituted with a non-volatile memory such as a flash memory. Data such as image data expressing an image captured via the imaging unit 200 can be written into, saved at, and read out from, the memory card 200 in response to commands issued by the CPU 101A.

In response to a light emission instruction issued from the CPU 101A, the illumination device 108 causes a light emitting element to emit light and outputs illuminating light to be used to illuminate the subject toward a point to the front of the electronic camera 10 through the illuminating light window 12.

Information such as an image or text is brought up on display at the liquid crystal display unit 104 (17 in FIG. 2) in response to a command issued by the CPU 101A. The text information may indicate the operating state of the electronic camera 10, an operation menu or the like.

(Imaging Unit)

The imaging unit 220 includes a photographic lens 221 (11 in FIG. 1), an image sensor 222, a lens drive circuit 223 and a photographing control circuit 224. The image sensor 222 may be a CCD image sensor or a CMOS image sensor. In response to commands issued by the CPU 101A, the photographing control circuit 224 controls the drive of the image sensor 222 and the lens drive circuit 223 and also executes specific image processing on imaging signals (accumulated charge signals) output from the image sensor 222. Such image processing may be white balance processing or gamma processing.

The subject image is formed via the photographic lens 221 onto the imaging surface of the image sensor 222. In response to a photographing start instruction, the photographing control circuit 224 starts imaging operation at the image sensor 222, reads out the accumulated charge signals from the image sensor 222 at the imaging operation completion and provides image data resulting from the image processing described above to the CPU 101A.

Based upon a focus adjustment signal output from the photographing control circuit 224, the lens drive circuit 223 drives a focus lens (not shown) constituting the photographic lens 221 back and forth along the optical axis. In addition, based upon a zoom adjustment signal output from the photographing control circuit 224, the lens drive circuit 223 drives a zoom lens (not shown) constituting the photographic lens 221 back and forth along the optical axis (toward the telephoto side or the wide-angle side). The target focus adjustment quantity and zoom adjustment quantity to be achieved are indicated by the CPU 101A to the photographing control circuit 224.

(Projector Unit)

In reference to FIGS. 3 through 6, the projector unit 120 is described. As shown in the block diagram presented in FIG. 3 and the illustration of the projector unit structure provided in FIG. 4, the projector unit 120 includes a projection optical system 121, a reflection type liquid crystal panel 122, an LED light source 123, a condenser optical system 124, a mirror 125, a PBS (polarization beam splitter) block 126, a projection control circuit 127 and a polarizer 128. The reflective liquid crystal panel 122, which functions as a projection image forming unit, generates a projection image over an image display area 122A at the reflective liquid crystal panel 122 in response to a drive signal provided from the projection control circuit 127. The image display area 122A is an effective area that is actually utilized when forming the projection image. It is to be noted that no projection image is formed over an ineffective area 122B. In response to a projection command output from the CPU 101A, the projection control circuit 127 provides control signals to the LED light source 123 and the reflective liquid crystal panel 122.

The LED light source 123, which may be a white LED constituted with a blue LED and a yellow phosphorescent substance, outputs white light based upon a projection command issued by the CPU 101A, input thereto via the projection control circuit 127. The condenser optical system 124 is a collimate optical system that outputs toward the PBS block 126 substantially parallel light obtained by altering the state of the white light having been output from the LED light source 123 and entered thereat, to a substantially parallel state. The PBS block 126 is a polarization beam splitter that includes a polarization splitter portion 126a assuming a 45° angle relative to the optical axis of the illuminating light departing the condenser optical system 124. The reflective liquid crystal panel 122 constituted with reflective liquid crystal elements (LCOS) is disposed at the upper side surface of the PBS block 126.

The mirror 125 is disposed at the surface of the PBS block 126 facing toward the condenser optical system 124. As the schematic illustration (perspective) of the positional arrangement assumed in the projector unit in FIG. 5(a) indicates, an opening 125OP, assuming a shape corresponding to the shape of the image display area 122A at the reflective liquid crystal panel 122, is formed at the mirror 125. The opening 125OP may assume, for instance, a rectangular shape. The mirror 125 formed by, for instance, vapor-depositing aluminum or the like onto the PBS block 126, is a reflecting member used to reflect the portion of the illuminating light emitted from the LED light source 123, which would otherwise reach the ineffective area 122B at the reflective liquid crystal panel 122, and allow the reflected light to reenter the LED light source 123. As shown in FIG. 5(b), the mirror 125 is set so as to range perpendicular to the direction along which the parallel light departing the condenser optical system 124 advances. Thus, the light reflected at the mirror 125 is directed to travel back to the LED light source 123 through an optical path that is substantially the same as the optical path through which the light initially travels toward the mirror 125. A film polarizer 128 is disposed at the opening 125OP in the mirror 125. In other words, the mirror 125 is positioned so as to enclose the polarizer 128. It is to be noted that the polarizer 128 may be disposed at a position away from the mirror 125 along the light advancing direction.

Illuminating light emitted from the LED light source 123, which then passes through the opening 125OP at the mirror 125, i.e., which is transmitted through the polarizer 128, illuminates the reflective liquid crystal panel 122. A surface 126b of the PBS block 126 will have been through an antireflection processing such as blackening.

Figure 6:
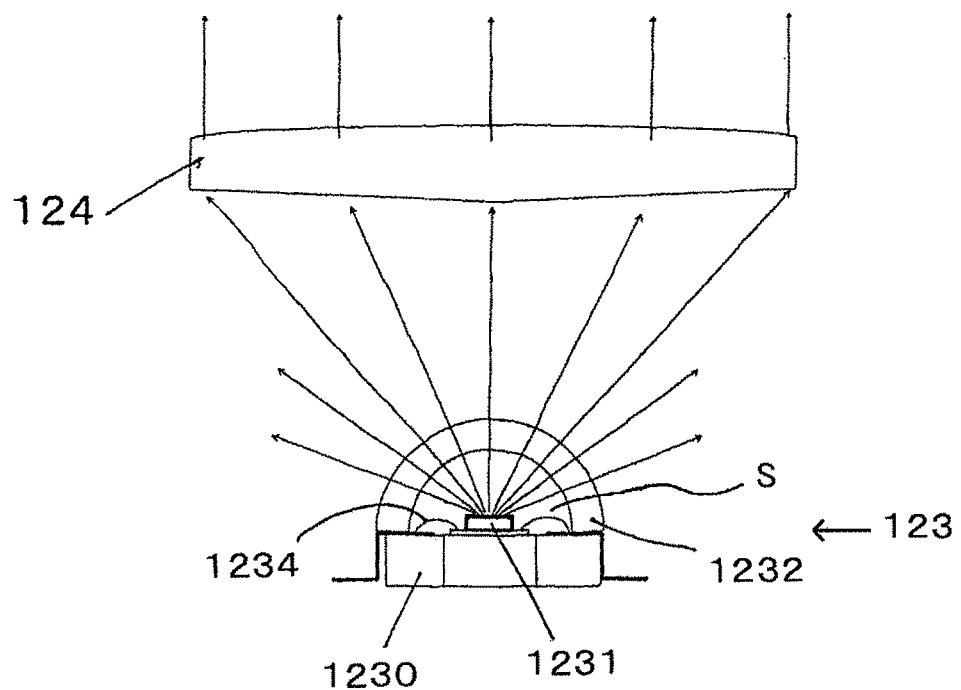

FIG. 6 is a sectional view showing the LED light source 123 in an enlargement. The LED light source 123 is constituted with a base member 1230, a light emitting diode element (hereafter referred to as an LED chip) 1231, a cover 1232, an electrode 1233, a wire 1234 and the like. The LED chip 1231 disposed on the base member 1230 is a white-color LED manufactured by shielding a blue light emitting member (LED) with a yellow light emitting phosphorescent substance. Namely, the blue light emitted from the blue-color light emitting member is output as blue-color component light after passing through the yellow-color light emitting phosphorescent substance and also excites the yellow-color light emitting phosphorescent substance. The phosphorescent substance, having become excited, emits yellow-color component light. As a result, white light is emitted from the LED chip 1231.

The cover 1232, constituted with a transparent material such as plastic formed into a semi-spherical shape similar to that of a hollow dome, is placed above the base member 1230 so as to cover the LED chip 1231. In addition, a space S formed between the cover 1232 and the base member 1230 is filled with a transparent gel having a refractive index substantially equal to that of the material constituting the cover 1232.

Blue-color component reflected light in the light having been reflected at the mirror 125 described above and redirected into the LED light source 123 to reach the LED chip 1231 excites the yellow-color light emitting phosphorescent substance constituting the LED chip 1231. Since the yellow-color light emitting phosphorescent substance is excited with the blue-color component reflected light as well as the blue-color component light radiated from the blue-color light emitting member at the LED chip 1231, a greater amount of light is emitted from the yellow-color light emitting phosphorescent substance. In addition, blue-color component reflected light in the reflected light having been reflected off a reflecting portion 1232b, which is not used to excite the yellow-color light emitting phosphorescent substance, travels into the LED chip 1231, where it is repeatedly reflected and refracted before being emitted toward the outside of the LED chip 1231. Furthermore, the yellow-color component light in the light having been reflected off the reflecting portion 1232b and having reached the LED chip 1231 is repeatedly reflected or refracted inside the LED chip 1231 before it is emitted toward the outside of the LED chip 1231.

Part of the light re-emitted from the LED chip 1231 as described above is transmitted through the opening 125OP, whereas the rest of the light is reflected at the mirror 125 and is redirected to travel back to the LED chip 1231. The light having returned to the LED chip 1231 is re-emitted again from the LED chip 1231 through the process described above. Consequently, the light emitted toward the ineffective area 122b at the reflective liquid crystal panel 122 can be redirected to travel toward the image display area 122A.

Figure 4:
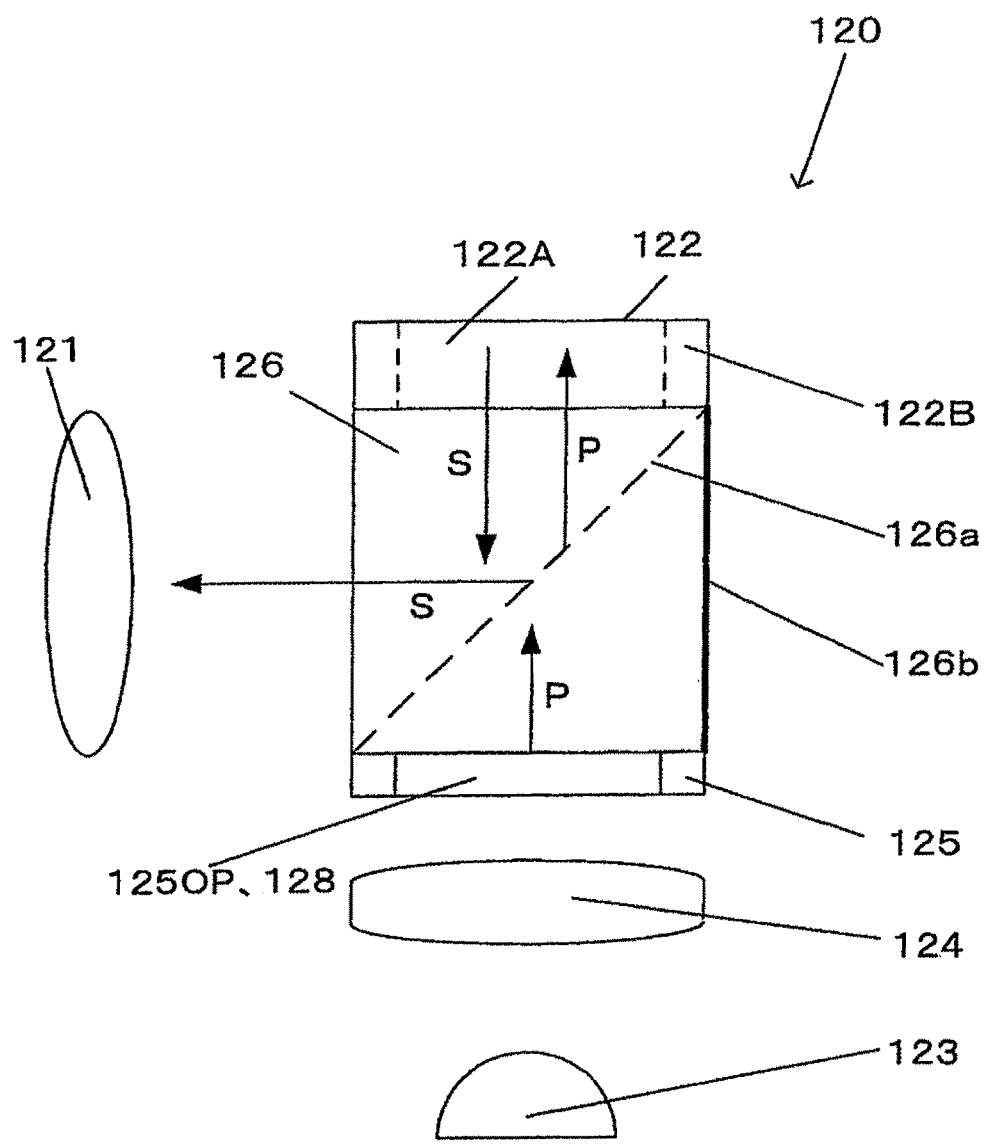

In reference to FIGS. 4 and 6, the operation of the projector unit structured as described above is explained.

A drive current generated based upon a control signal provided from the projection control circuit 127 is supplied to the LED chip 1231 via the wire 1234 and the electrode 1233. The LED chip 1231 emits light with a luminance level corresponding to the drive current toward the condenser optical system 124. The LED light converted to substantially parallel light at the condenser optical system 124 then enters the polarizer 128. The polarizer 128 converts light having entered therein to linearly polarized light (or extracts linearly polarized light from the light having entered therein) and directs the polarized light resulting from the conversion (or the extracted polarized light) toward the PBS block 126.

The polarized light flux (e.g., p-polarized light) having entered the PBS block 126 is transmitted through the PBS block 126 and illuminates the reflective liquid crystal panel 122. The reflective liquid crystal panel 122 constituting the projection image forming unit is made up with a plurality of pixels at which red, green and blue filters are formed, and generates a color image. Upon entering the reflective liquid crystal panel 122, the light to be transmitted through the liquid crystal layer at the reflective liquid crystal panel 122 advances through the liquid crystal layer along the upward direction in FIG. 4. The light having advanced upward through the liquid crystal layer is reflected at a reflecting surface of the reflective liquid crystal panel 122, then advances through the liquid crystal layer along the downward direction in FIG. 4 and exits the reflective liquid crystal panel 122 before reentering the PBS block 126. Since the liquid crystal layer functions as a phase plate when a voltage is applied thereto, the light reentering the PBS block 126 is mixed light made up with modulated s-polarized light and unmodulated p-polarized light. At the PBS block 126, only the modulated light constituted with the s-polarized light component in the light flux having reentered therein is reflected (bent) at the polarization splitter portion 126a and is radiated as projection light toward the projection optical system 121 located to the left.

The following advantages are achieved through the first embodiment described above.

(1) The mirror 125, with the opening 125OP thereat assuming a shape corresponding to the shape of the image display area 122A, is disposed between the LED light source 123 and the reflective liquid crystal panel 122. The portion of the light emitted from the LED light source 123 that would not enter the image display area 122A is reflected at the mirror 125 and redirected to travel back to the LED light source 123 so that it can be re-emitted as light advancing toward the image display area 122A. As a result, the extent of unevenness in the illuminating light, attributable to the geometric-optical difference between the length of the optical path extending through the LED light source 123 and the reflective liquid crystal panel 122 and the length of the optical path extending through the mirror 125 and the reflective liquid crystal panel 122, can be minimized and thus, a better quality projection image can be provided. In addition, the light that would otherwise enter the ineffective area 122B, i.e., light that is wasted in the related art, can be utilized, improving the utilization efficiency with which the light provided from the LED light source 123 is utilized and the increase in the amount of light entering the image display area 122A results in a brighter projection image.

(2) Since the mirror 125 redirects the light that would otherwise enter the ineffective area 12213 to travel back to the LED light source 123 by reflecting the light, no reflected light is allowed to enter the PBS block 126, making it possible to prevent an occurrence of scattered light that would be likely to cause a ghosting phenomenon.

(3) The LED chip 1231 is a white-color LED that emits white light composed of blue-color component light emitted through an LED and yellow-color component light emitted as a phosphorescent substance is excited by the blue-color component light. The yellow-color phosphorescent substance in the LED chip 1231 achieving the characteristics described above is also excited with the blue-color component in the light reflected from the mirror 125. In other words, light from the LED chip 1231, which is not utilized as projection light (illuminating light) can be used for purposes of exciting the phosphorescent substance to result in an increase in the amount of light emitted from the LED light source 123.

The projector unit 120 achieved in the first embodiment as described above allows for the following variations.

(1) Instead of disposing the mirror 125 in contact with the PBS block 126 as shown in FIG. 4, the mirror 125 may be set at a position away from the PBS block 126. As an alternative, a mirror 125 constituted of aluminum or the like may be vapor-deposited on the lower side surface of the PBS block 126.

(2) If light departing the periphery of the condenser optical system 124 fails to achieve a parallel state with a high level of accuracy, the mirror 125 may be disposed as shown in FIG. 7(*a*) as a remedial measure. In such a case, the mirror 125 should assume a predetermined curvature (optical power) so as to ensure that the light reflected at the mirror 125 returns to the LED light source 123 through the same optical path as that through which the light initially reached the mirror 125. It is to be noted that a reflecting member formed by vapor-depositing aluminum or the like onto the surface of the condenser optical system 124 through which light exits the condenser optical system toward the exit side of the PBS block 126, as shown in FIG. 7(*b*), may be used instead.

Figure 8:
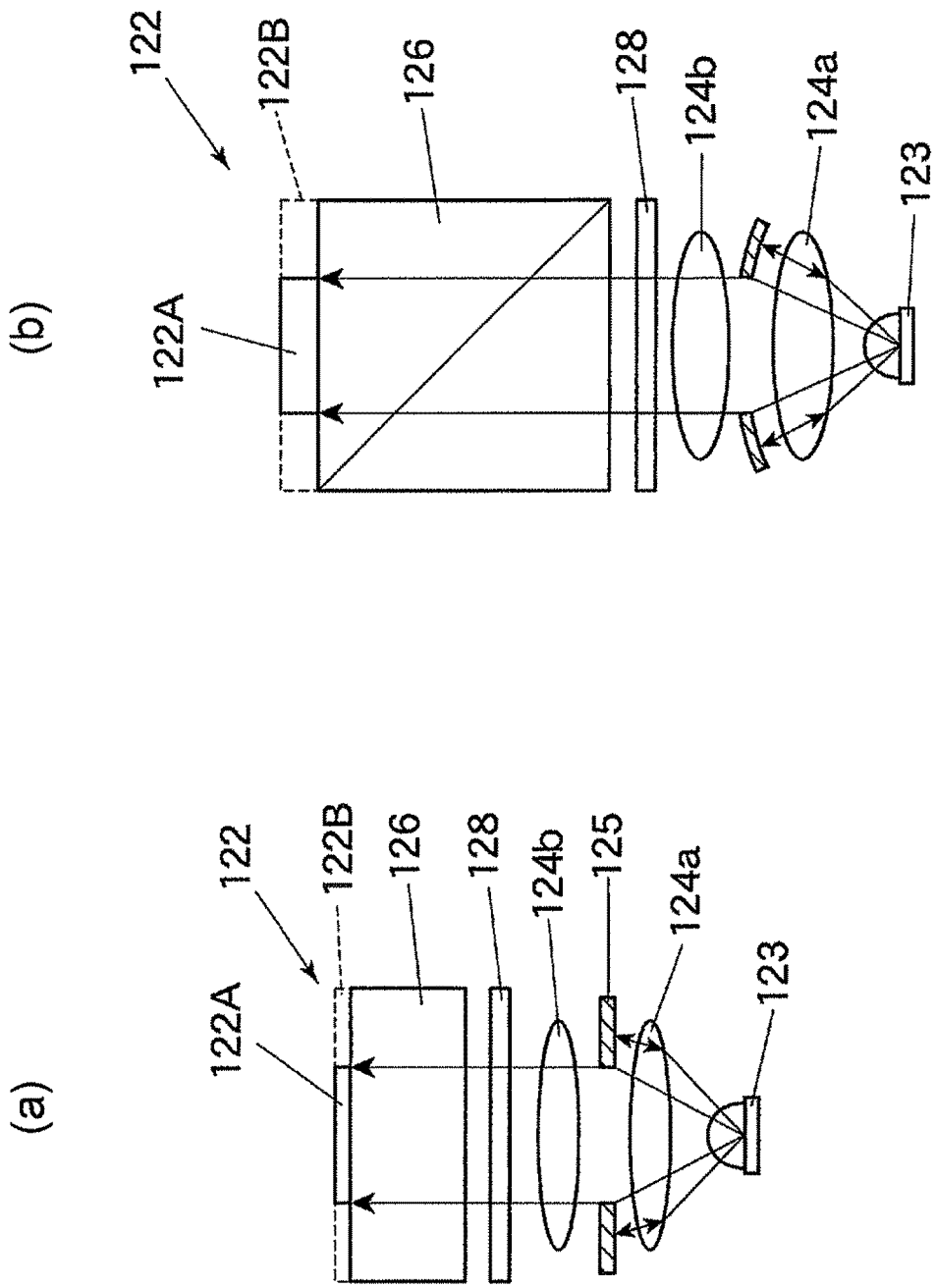

(3) The condenser optical system 124 may be constituted with a plurality of lenses 124a and 124b and, in such a case, the mirror 125 may be disposed between the lens 124a and the lens 124b. FIG. 8 presents examples of positional arrangements that may be adopted in such a configuration. FIG. 8(*a*) shows the mirror 125 disposed to range perpendicular to the direction in which the parallel light exiting the lens 124a advances. FIG. 8(*b*) presents an example in which the mirror 125 assumes a predetermined level of optical power under circumstances similar to those described above in (2), i.e., when the light exiting via the peripheral area of the lens 124a fails to achieve a parallel state. It is to be noted that a reflecting member formed by vapor-depositing aluminum or the like onto the lens 124a may be used instead.

(4) The mirror 125 may assume a shape at least part of which corresponds to the shape of the image display area 122A. In other words, the mirror may assume a shape that allows it to reflect only the light that would otherwise enter the ineffective areas 122B located on the top and bottom sides of the reflective liquid crystal panel 122 or on the left and right sides of the reflective liquid crystal panel 122. For instance, the image display area 122A may be formed in a substantially rectangular shape that includes sides L1 and L2 (L1>L2). The areas adjacent to the longer sides L1 of the image display area 122A, which are part of the ineffective areas 122B are referred to as ineffective areas 122Ba and the areas adjacent to the shorter sides L2 of the image display area 122A are referred to as ineffective areas 122Bb. Since the areal size of the ineffective areas 122Ba is greater than the areal size of the ineffective areas 122Bb, the light that would enter the ineffective areas 122Ba adjacent to the longer sides L1 of the image display area 122A should be reflected at the mirror 125. Namely, a mirror 125 should be constituted with reflecting portions, i.e., mirrors 125a and 125b, which are placed at positions set apart from each other over a distance corresponding to the length of the sides L2 of the image display area 122A.

—Second Embodiment—

Figure 10:
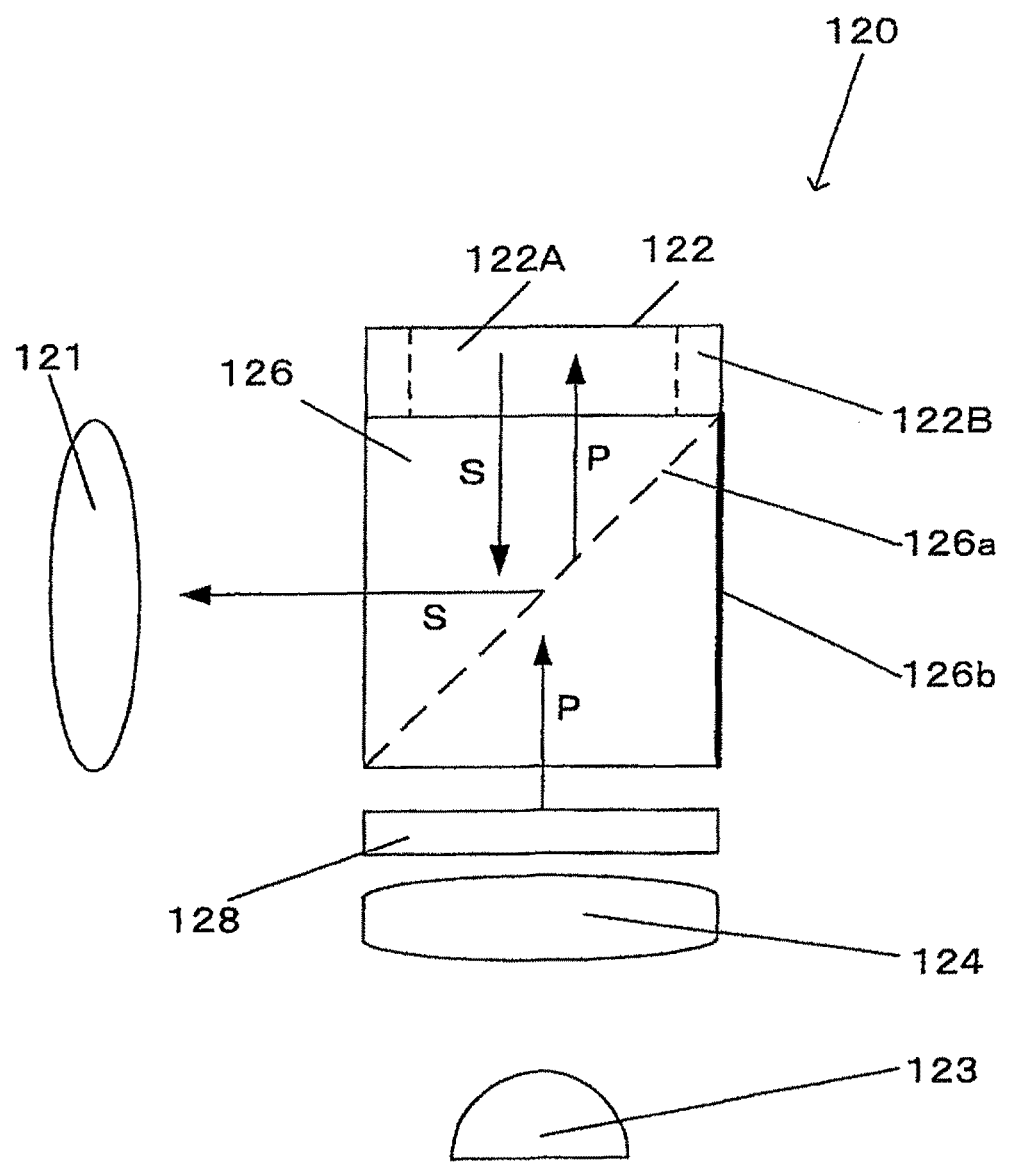
Figure 11:
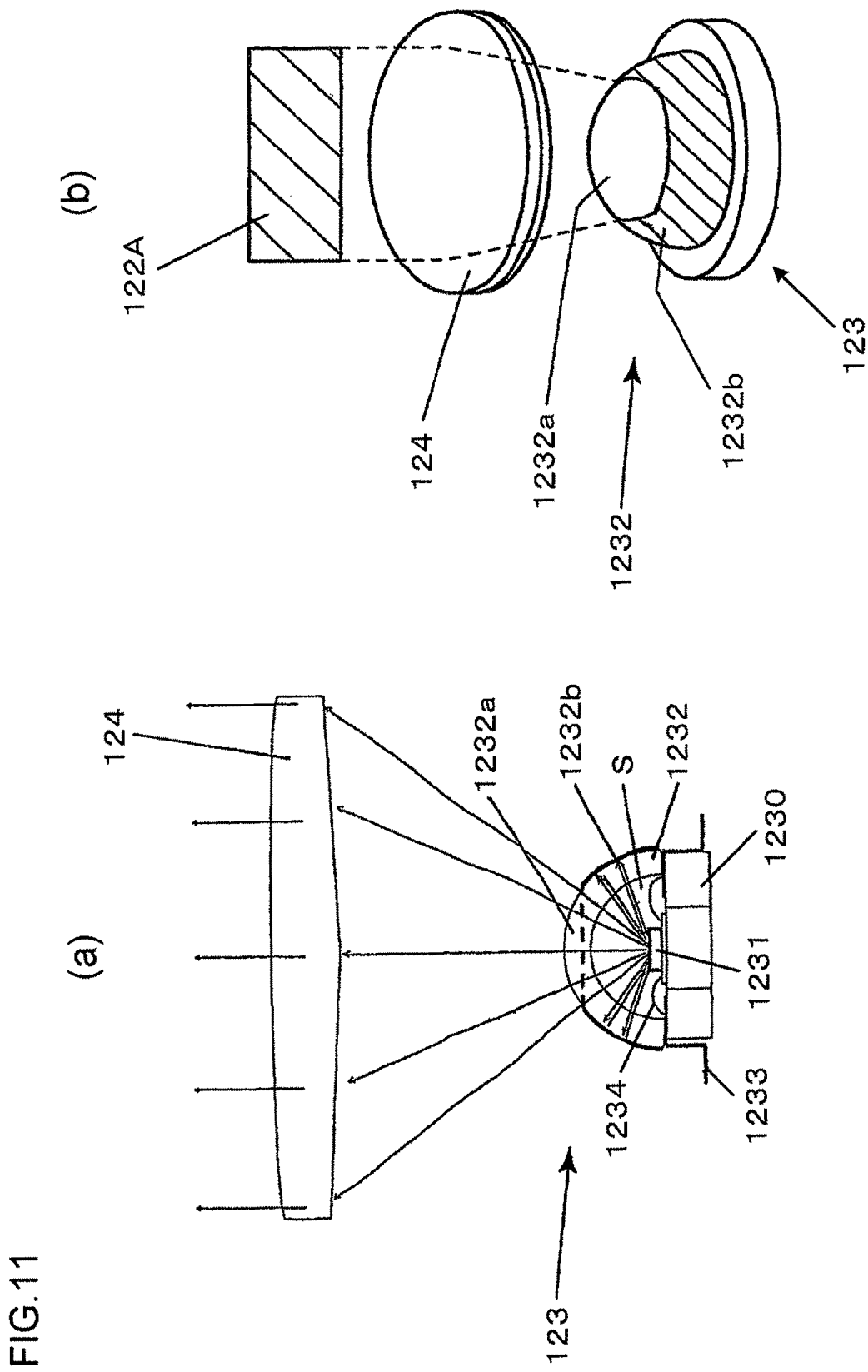

In reference to FIGS. 10 and 11, the second embodiment of the electronic camera equipped with the projector according to the present invention is described. The following explanation focuses on the features of the second embodiment differentiating it from the first embodiment by assigning the same reference numerals to components thereof identical to those in the first embodiment. Any feature of the second embodiment that is not specially noted should be assumed to be similar to the corresponding feature of the first embodiment. The embodiment differs from the first embodiment in that a reflecting member is disposed at the LED light source 123 as a replacement for the mirror 125

As shown in FIG. 10, the polarizer 128 is disposed further toward the PBS block 126 relative to the condenser optical system 124. Namely, a reflecting portion 1232b (see FIG. 11), equivalent to the mirror 125 in the first embodiment is disposed on the side where the LED light source 123 is located rather than on the side where the polarizer 128 is located at the projector 120 achieved in the second embodiment.

As shown in the sectional view of the LED light source 123 presented in FIG. 11(*a*), a reflecting film is formed over the external circumferential surface of the cover 1232, except for a specific area near the apex of the cover, at the LED light source 123 achieved in the second embodiment. In other words, a transmitting portion 1232*a* through which light emitted from the LED chip 1231 is transmitted and the reflecting portion 1232*b* at which the light having exited the LED chip is reflected are formed at the cover 1232. It is to be noted that the cover 1232 assumes a hollow dome shape, as explained earlier. In addition, the cover 1232 is positioned so that the center of its semi-spherical shape is substantially aligned with the center of the LED chip 1231. Through the transmitting portion 1232*a* formed at the apex of the cover 1232, the white light emitted from the LED chip 1231 is transmitted and guided toward the condenser optical system 124. As the external view presented in FIG. 11(*b*) shows, the area of this transmitting portion 1232*a* is defined based upon the shape of the image display area 122A at the reflective liquid crystal panel 122. Namely, the area taken up by the transmitting portion 1232*a* is defined by ensuring that all the light having been transmitted through the cover 1232 is allowed to enter the image display area 122A.

The reflecting portion 1232*b* is formed in order to redirect the part of the light emitted from the LED chip 1231, which would not enter the image display area 122A and thus would not be used as illuminating light, to allow it to travel back to the light source to be effectively used. Such a reflecting portion 1232*b* may be formed by, for instance, vapor-depositing aluminum or the like onto the surface of the cover 1232. Since the reflecting portion 1232*b* is located at the external circumferential surface of the semi-spherical cover 1232, the light emitted from the LED chip 1231 and reflected at the reflecting portion 1232*b* enters the LED chip 1231 over an area substantially at the center of the semi-spherical shape. Since the area taken up by the transmitting portion 1232*a* is defined based upon the shape of the image display area 122A at the reflective liquid crystal panel 122 as explained earlier, the light, which would not enter the image display area 122A, is all reflected at the reflecting portion 1232*b* to return to the LED chip 1231.

The light having been reflected at the reflecting portion 1232*b* and having returned to the LED chip 1231 travels into the LED chip 1231, is repeatedly reflected and refracted inside the LED chip and then exits the LED chip 1231 again as in the first embodiment. Part of the light having re-exited the LED chip 1231 is transmitted through the transmitting portion 1232*a*, whereas the remainder of the light is reflected at the reflecting portion 1232*b* and returns to the LED chip 1231. Thus, the light initially emitted toward the ineffective area at the reflective liquid crystal panel 122 can still be redirected to ultimately travel toward the image display area 122A.

The following advantages are achieved through the second embodiment described above.

(1) The transmitting portion 1232*a* assuming a shape corresponding to the shape of the image display area 122A and the reflecting portion 1232*b* that reflects the emitted light are formed at the external circumferential surface of the cover 1232 at the LED light source 123. Via the reflecting portion 1232*b*, the part of the light emitted from the LED chip 1231, which would not enter the image display area 122A, is redirected to travel back to the LED chip 1231 from which it is subsequently emitted toward the image display area 122A. As a result, the light that would otherwise enter the ineffective area 122B, i.e., the light that is wasted in the related art, can be effectively utilized, thereby achieving an advantage similar to that in (1) in the first embodiment.

(2) The part of the light emitted from the LED chip 1231, which would not enter the condenser optical system 124 is also redirected to travel back to the LED chip 1231 to be effectively used by forming the reflecting portion 1232*b* in a shape corresponding to the shape of the image display area 122A, as shown in FIG. 11. As a result, unlike the light LA emitted from the LED light source 223 in the related art shown in FIG. 12, which travels sideways from the LED chip 223*a* and thus cannot be effectively utilized, the light LA emitted from the LED light source achieved in the second embodiment can be utilized effectively and thus a further improvement is achieved in the utilization efficiency with which the light is utilized even over the LED light source 123 in the first embodiment.

(3) The reflecting portion 1232*b* is formed at the cover 1232, i.e., the reflecting portion 1232*b* assumes a position further toward the LED chip 1231 relative to the polarizer 128. As a result, the light having been reflected at the reflecting portion 1232*b* and having been transmitted through the transmitting portion 1232*a* before exiting the transmitting portion can be guided to the polarizer 128 with a high degree of reliability.

The projector unit 120 achieved in the second embodiment allows for the following variations.

Figure 13:
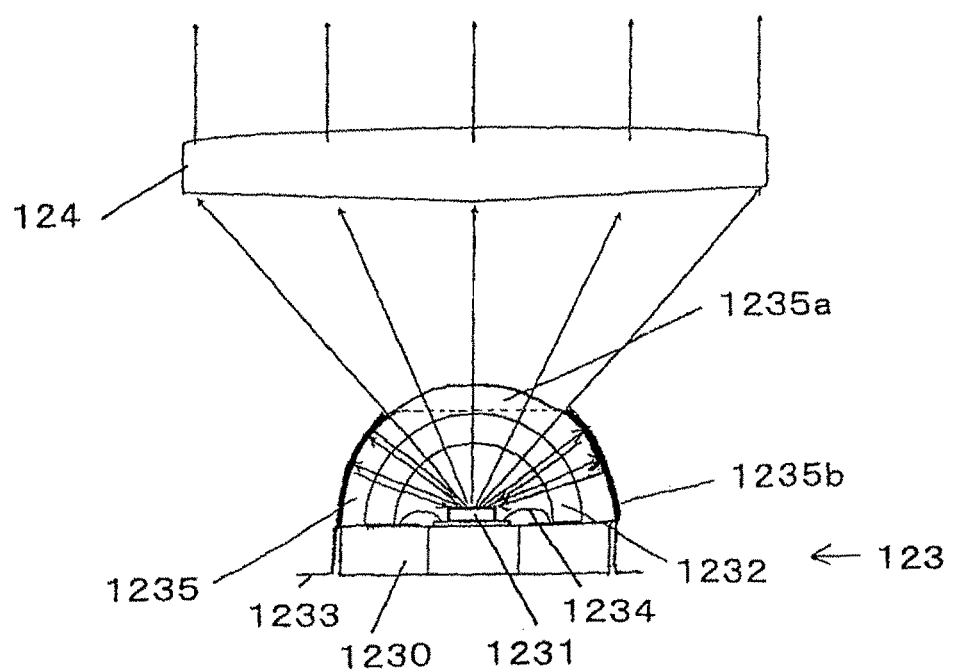

(1) Instead of forming the transmitting portion 1232*a* and the reflecting portion 1232*b* at the cover 1232 shielding the LED light source 123, a cap that includes a transmitting portion and a reflecting portion may be disposed at the light source. FIG. 13 shows an LED light source 123 adopting such a structure in a sectional view. The LED light source 123 includes a cap 1235, which is constituted of a transparent material achieving a refractive index substantially equal to that of the material constituting the cover 1232, and is formed in a semi-spherical shape similar to that of a hollow dome, and is disposed so as to shield the cover 1232. It is to be noted that the cap 1235 and the cover 1232 may be in close contact with each other as shown in FIG. 13, or there may be a space between the cap 1235 and the cover 1232. Any space present between the cap 1235 and the cover 1232 should be filled with a transparent gel having a refractive index substantially equal to those of the materials constituting the cap 1235 and the cover 1232.

The cap 1235 includes a transmitting portion 1235*a* and a reflecting portion 1235*b* formed by vapor-depositing aluminum or the like onto the external circumferential surface of the cap 1235. The area taken up by the transmitting portion 1235*a* is defined based upon the shape of the image display area 122A at the reflective liquid crystal panel 122. Thus, the white light emitted from the LED chip 1231 is transmitted through the cover 1232 and the transmitting portion 1235*a* and is guided via the condenser optical system 124 to the image display area 122A. In addition, the white light having been transmitted through the cover 1232 and reflected at the reflecting portion 1235*b* is retransmitted through the cover 1232 and travels back to the LED chip 1231. Hence, the part of the light emitted from the LED chip 1231, which would not enter the image display area 122A, is redirected to travel back to the LED chip 1231 to be effectively used.

(2) Instead of the reflecting portion 1232*b* formed by vapor-depositing aluminum or the like onto the external circumferential surface of the cover 1232, a reflecting portion 1232*b* may be formed at an inner circumferential area of the cover 1232. In addition, instead of the reflecting portion 1235*b* formed by vapor-depositing aluminum or the like onto the external circumferential surface of the cap 1235 as described above in (1), a reflecting portion 1235*b* may be formed at an inner circumferential area of the cap 1235.

The projector unit 120 achieved in either the first embodiment or the second embodiment as described above allows for the following variations.

(1) The LED light source 123 may emit white light constituted with R-color light, G-color light and B-color light, each emitted from one of three LED chips. The light having been reflected at the reflecting portion and having traveled back to the three LED chips in this LED light source 123 will be repeatedly reflected inside the LED light source 123 before exiting the LED light source. Consequently, light that is not effectively used as illuminating light to illuminate the projection image in the related art can be utilized, thereby contributing towards an increase in the amount of light output from the LED light source.

(2) Instead of the PBS block 126, a wire grid polarizer or a birefringent reflective polarizer 400, such as that shown in FIG. 14(a) may be used.

(3) The transmissive liquid crystal panel 500 shown in FIG. 14(b) may be used in place of the reflective liquid crystal panel 122. In conjunction with such a transmissive liquid crystal panel, too, the opening 125OP at the mirror 125 or the transmitting portion 1232a at the LED light source 123 should be formed in a shape corresponding to the shape of the image display area 500A at the transmissive liquid crystal panel 500.

—Third Embodiment—

Figure 15:
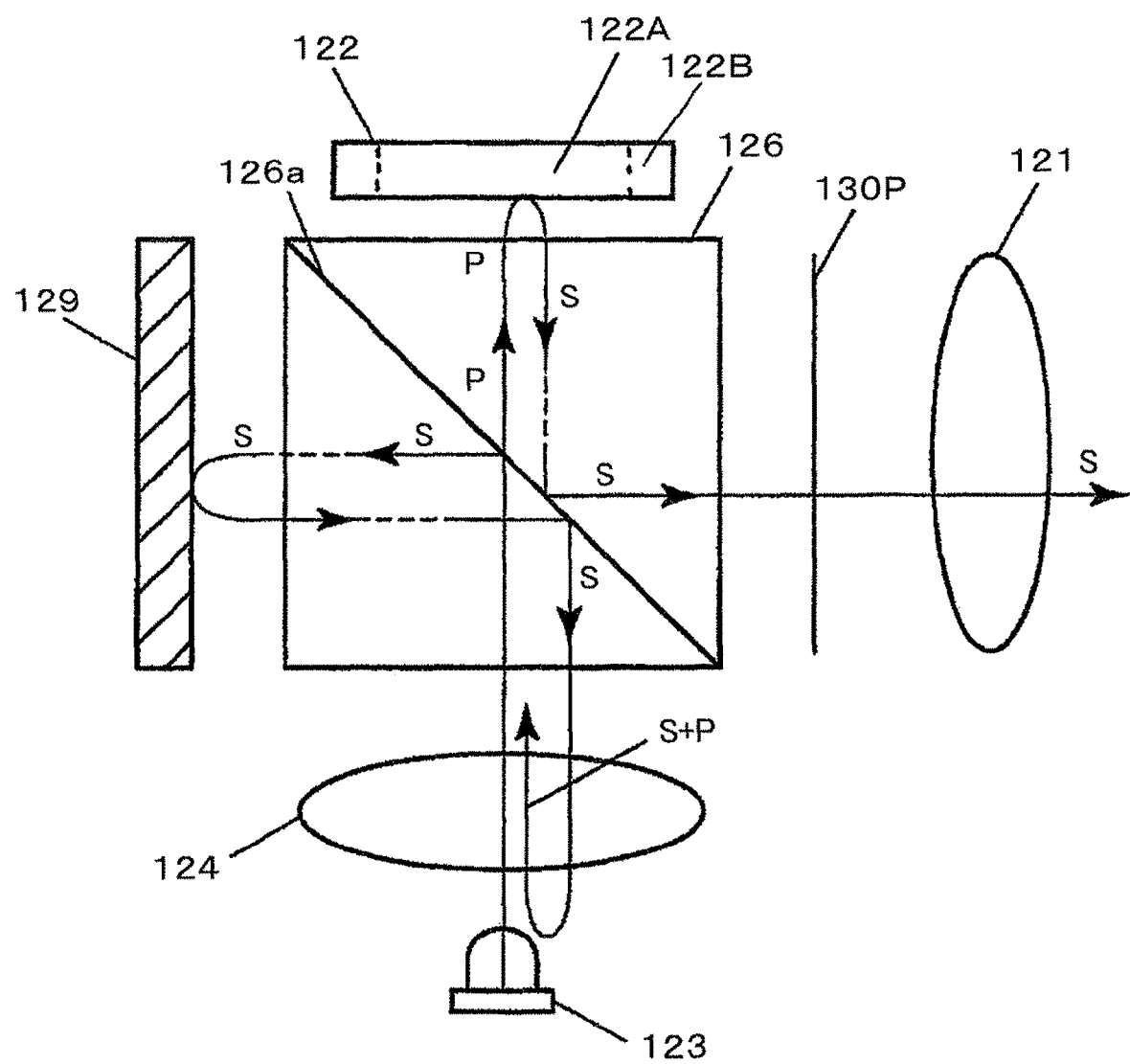
Figure 16:
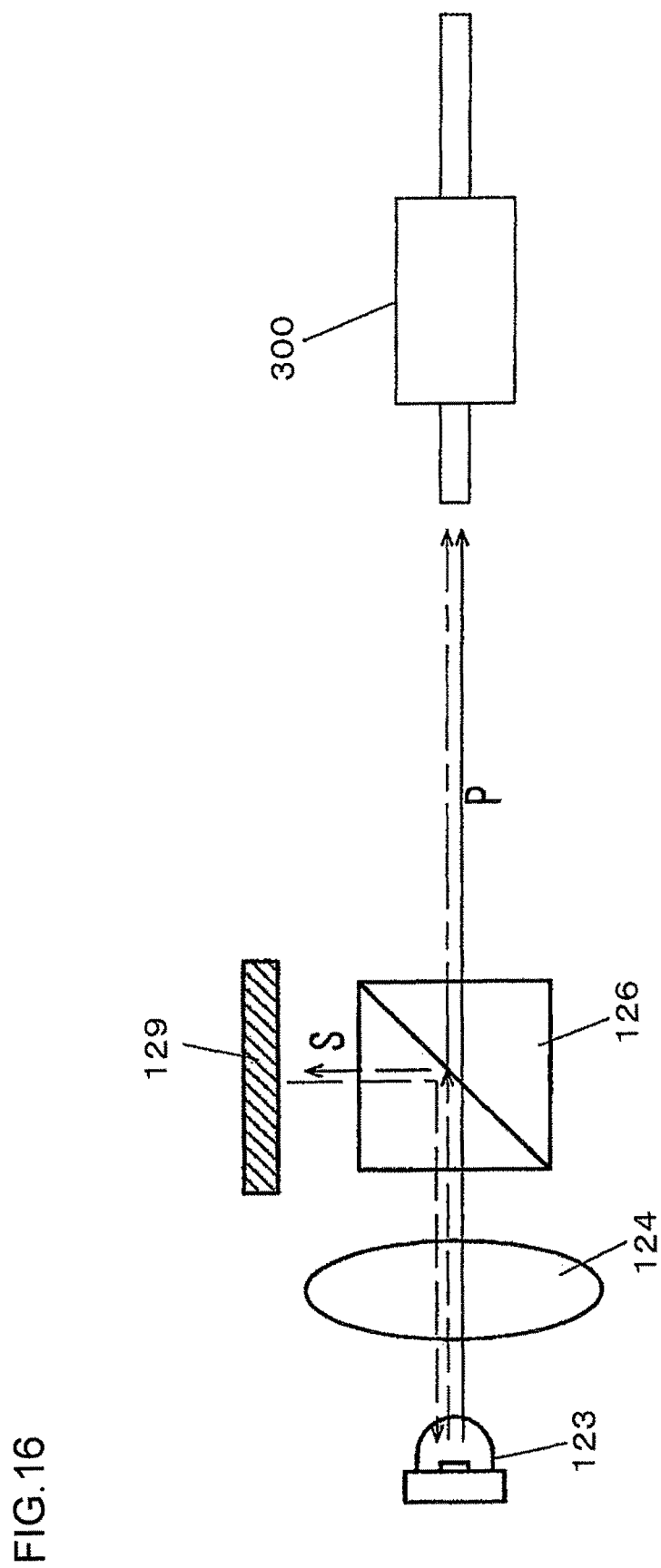
Figure 17:
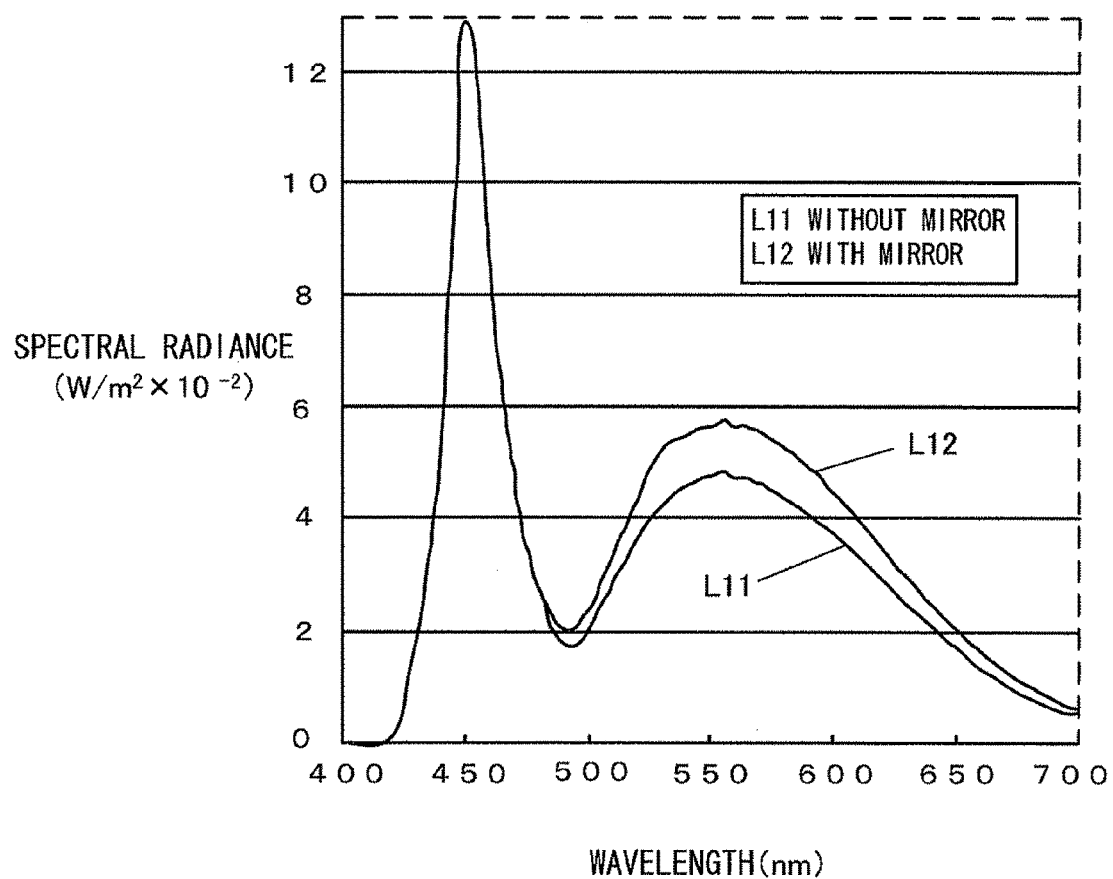

In reference to FIGS. 15 through 17, the third embodiment of the electronic camera equipped with the projector according to the present invention is described. The following explanation focuses on the features of the third embodiment differentiating it from the first embodiment by assigning the same reference numerals to components thereof identical to those in the first embodiment. Any feature of the third embodiment that is not specially noted should be assumed to be similar to the corresponding feature of the first embodiment. The third embodiment differs from the first embodiment in the structure assumed in the projector unit 120.

As shown in FIG. 15, the projector unit (projector) 120 includes an LED light source (high-luminance white-color LED) 123, a condenser optical system (condenser lens) 124, a PBS (polarization beam splitter) block 126, a reflective liquid crystal panel 122, a reflecting mirror 129, an absorption-type polarizer 130P and a projection optical system (projection lens) 121, which are all housed inside a case and are thus provided as an integrated unit. The reflective liquid crystal panel 122 may be, for instance, an LCOS (liquid crystal on silicon) panel. It may be either a monochrome liquid crystal panel or a color liquid crystal panel. The embodiment is described by assuming that the reflective liquid crystal panel 122 is constituted with a color liquid crystal display element. A projection image is formed over a specific image display area 122A at the reflective liquid crystal panel 122 in response to a drive signal provided from the projection control circuit 127. Namely, the image display area 122A is an effective area utilized in the formation of the projection image.

It is to be noted that the LED light source 123 is a phosphorescent LED that includes a blue-color LED and a YAG (yttrium aluminum garnet) phosphorescent layer formed at the front surface of the blue-color LED. As blue-color component light is emitted from the blue-color LED, part of the blue-color component light is absorbed into the phosphorescent substance and yellow-color component light emanates from the phosphorescent substance. White light is generated as the yellow-color component light becomes mixed with the remaining blue-color component light.

Divergent illuminating light emitted from the LED light source 123 enters the PBS block 126 via the condenser optical system 124. As explained earlier, the condenser optical system 124 is a lens that condenses the divergent rays of light beam emitted from the LED light source 123 so as to allow the light to travel parallel to the optical axis. The illuminating light having entered the PBS block 126 is split into a p-polarized light component and an s-polarized light component at the polarization splitter portion 126a at the PBS block 126. The p-polarized light is transmitted through the polarization splitter portion 126a and is output toward the reflective liquid crystal panel 122 through the surface of the PBS block 126 located on the upper side in the figure. The s-polarized light, on the other hand, is reflected at the polarization splitter portion 126a and is output toward the reflecting mirror 129 through the surface of the PBS block 126 located on the left side.

The p-polarized light having departed the PBS block 126 and entered the reflective liquid crystal panel 122 advances through the liquid crystal layer at the reflective liquid crystal panel 122, is reflected at the reflecting surface of the reflective liquid crystal panel 122 and then advances through the liquid crystal layer along the reverse direction before exiting the reflective liquid crystal panel 122 toward the PBS block 126. Image signals are input to the reflective liquid crystal panel 122 and a voltage matching the level of the corresponding image signal is applied to each pixel. At this time, the arrangement pattern with which the liquid crystal molecules are arranged at the liquid crystal layer is altered in correspondence to the voltage application condition, thereby allowing the liquid crystal layer to function as a phase plate. As a result, the light exiting the reflective liquid crystal panel 122 to travel toward the PBS block 126 includes modulated light obtained by modulating the p-polarized light to s-polarized light and unmodulated p-polarized light.

As described above, the p-polarized light having entered the reflective liquid crystal panel 122 undergoes a process of modulation in correspondence to the image on display. The light emitted from the reflective liquid crystal panel 122 (which includes both p-polarized light and s-polarized light), reenters the PBS block 126 where it undergoes the process of polarization splitting at the polarization splitter portion 126a. Through this process of polarization splitting, which is also referred to as light analysis, the s-polarized light (modulated light) in the light having entered the PBS block is reflected at the polarization splitter portion 126a, passes through the absorptive polarizer 130P and then is projected onto a screen (not shown) via the projection optical system 121.

The p-polarized light having been transmitted through the polarization splitter portion 126a, on the other hand, travels back through the optical path and enters the LED light source 123. This p-polarized light may be reflected within the LED light source 123 to reenter the PBS block 126 or may be used to excite the phosphorescent substance in the LED light source 123 again. The p-polarized light and the light resulting from the re-excitation of the phosphorescent substance are utilized as the illuminating light to illuminate the reflective liquid crystal panel 122.

The absorptive polarizer 130P disposed between the PBS block 126 and the projection optical system 121 is a polarizer that absorbs the p-polarized light component of the incoming light. The light having entered the PBS cannot be completely separated to p-polarized light and s-polarized light in reality, and the reflected light includes some p-polarized light. Since the p-polarized light included in the reflected light is bound to lower the contrast of the projection image, the polarizer 130P is inserted in order to absorb the p-polarized light in the projection light flux. It is to be noted that while the polarizer 130P is disposed between the PBS block 126 and the projection optical system 121 in this example, it may instead be disposed between the PBS block 126 and the reflecting mirror 129 or two polarizers may be installed, one between the PBS block and the projection optical system and one between the PBS block and the reflecting mirror.

The s-polarized light having departed the condenser optical system 124 and entered the PBS block 126 as illuminating light, is reflected at the polarization splitter portion 126*a*, enters the reflecting mirror 129 and then travels backward through the optical path before entering the LED light source 123. As is the case with the p-polarized light described above, the s-polarized light is reflected within the LED light source 123 and reenters the PBS block 126 or is used to re-excite the phosphorescent substance in the LED light source 123. The light emanating from the re-excited phosphorescent substance is used as illuminating light. In addition, the s-polarized light having reentered the PBS block 126 is reflected at the polarization splitter portion 126*a* and the reflecting mirror 129 and then reenters the LED light source 123. As the s-polarized light is repeatedly reflected between the LED light source 123 and the reflecting mirror 129 as described above, the s-polarized light is caused to rotate and the p-polarized light component in the s-polarized light is transmitted through the polarization splitter portion 126*a* and then enters the reflective liquid crystal panel 122.

As described above, the s-polarized light that is not used for projection and is thus wasted in the related art is redirected via the reflecting mirror 129 to travel back to the LED light source 123 so as to achieve a polarized light rotation effect with the reflected light and a re-excitation effect with the returning light. Consequently, part of the light wasted in the related art can be utilized as illuminating light for illuminating the reflective liquid crystal panel 122, and thus, a brighter projection image can be provided through more efficient utilization of the light generated at the light source. In addition, since the structure described above is achieved simply by adding the reflecting mirror 129 to the configuration of a light source in the related art, an improvement in the efficiency with which the light from the light source is utilized can be achieved while minimizing the overall size of the projection unit 120.

In the related art, the s-polarized light reflected at the polarization splitter portion 126*a* to the left in FIG. 15 is not utilized, which means that approximately 50% of the light generated at the LED light source 123 is wasted. However, by disposing a single reflecting mirror 129 as shown in FIG. 15, an improvement in the brightness of the projection image can be achieved. FIG. 16 illustrates a test conducted to verify that the brightness was improved. In the test, the light transmitted through the polarizing splitter portion 126*a* was measured by using a plane mirror as the reflecting mirror 129 and setting a spectrometer 300 so as to face opposite the LED light source 123 across the PBS block 126, i.e., on the side where the reflective liquid crystal panel 122 in FIG. 15 is located.

FIG. 17 provides the results of the transmitted light spectrometry. The spectral radiance is indicated along the vertical axis and the wavelength is indicated along the horizontal axis in FIG. 17, with a curve L11 representing the measurement results obtained without adding the reflecting mirror 129 in the configuration and a curve L12 representing the measurement results obtained by using the reflecting mirror 129. As described above, the LED light source 123 is a phosphorescent LED and thus, either set of results shows a peak corresponding to the blue-color component light generated via the blue color LED (the peak over a narrow wavelength range around 450 nm) and a peak corresponding to the yellow-color component light emanating from the YAG phosphorescent substance (the peak over a wide wavelength range around 550 nm).

Comparison of the curves L11 and L12 in FIG. 17 reveals that a higher peak was achieved in correspondence to the yellow-color component light when the reflecting mirror 129 was included in the configuration, indicating an increase in the amount of light emanating from the phosphorescent substance. This increase in the amount of light can be assumed to be attributable to the effect of the re-excitation of the phosphorescent substance by the s-polarized light having returned to the LED light source 123 after having been reflected at the reflecting mirror 129. Consequently the test results indicate that the radiance improved by approximately 19%.

In addition, a phosphorescent white color LED generates pseudo-white light by exciting the phosphorescent substance with light from the blue color LED, and thus causing the phosphorescent substance to emanate yellow-color component phosphorescent light. For this reason, the blue-color component light assumes a high peak, as indicated in FIG. 17, and a bluish-white light is generated. However, the use of the reflecting mirror 129 leads to an increase in the amount of yellow-color component light, which contributes to an improvement in the color tone, i.e., a color closer to that of natural light, in addition to an increase in the overall amount of white light generated by the light source.

It is to be noted that since the test was conducted by placing the spectrometer 300 to the front of the LED light source 123 on the optical axis of the LED light source, the polarized light rotation effect attributable to the reflection occurring at the LED chip surface could not be detected easily and the results provided in FIG. 17 simply indicate a pronounced re-excitation effect. However, the polarized light rotation effect can be verified by measuring light away from the optical axis.

—Fourth Embodiment—

The fourth embodiment of the electronic camera equipped with the projector according to the present invention is described. The following explanation focuses on the features of the fourth embodiment differentiating it from the third embodiment by assigning the same reference numerals to components thereof identical to those in the third embodiment. Any feature of the second embodiment that is not specially noted should be assumed to be similar to the corresponding feature of the third embodiment. The projector unit 120 in the embodiment is similar to that achieved in the third embodiment, except that the LED light source 123 described in reference to the second embodiment is used as its light source.

As has been described in reference to FIG. 11, an opening area constituting the transmitting portion 1232*a* is formed at the cover 1232 of the LED light source 123 so as to substantially set the image display area 122A at the reflective liquid crystal panel 122 and the irradiating range which is irradiated with the light transmitted through the cover 1232 in alignment with each other. Thus, the light emitted sideways from the LED chip 1231, i.e., the light, which would not enter the condenser optical system 124 and would therefore not be utilized as illuminating light, is reflected at the reflecting portion 1232*b* and travels back to the light source to be effectively used. As explained above, the center of the cover 1232 and the center of the LED chip 1231 are substantially in alignment with each other and as a result, the light emitted from the LED chip 1231 and reflected at the reflecting portion 1232*b* then enters the LED chip 1232 assuming a position substantially at the center of the semi-spherical shape.

The blue-color component reflected light in the light having been reflected at the reflecting portion 1232*b* and having reached the LED chip 1231 excites the yellow color light emitting phosphorescent substance constituting the LED chip 1231. As explained earlier, the blue-color component light radiated from the blue color light emitting member in the LED chip 1231 also excites the yellow color light emitting phosphorescent substance as well as the blue-color component reflected light entering the LED chip, and thus, a greater amount of light is output by the yellow color light emitting phosphorescent substance. In addition, part of the blue-color component reflected light in the light having been reflected from the reflecting portion 1232*b*, which is not used to excite the phosphorescent substance, travels into the LED chip 1231, is repeatedly reflected and refracted inside the LED chip 1231 and then travels out of the LED chip 1231 again. The yellow-color component light in the light having been reflected at the reflecting portion 1232*b* and having reached the LED chip 1231 is also repeatedly reflected and refracted inside the LED chip 1231 before traveling out of the LED chip 1231 again.

Part of the light emitted from the LED chip 1231 again as described above is transmitted through the transmitting portion 1232*a*, whereas the remainder of the light is reflected at the reflecting portion 1232*b* and returns to the LED chip 1231 yet again. Then, the light having returned to the LED chip 1231 is re-emitted from the LED chip 1231 again as described above. As a result, the light initially emitted sideways from the LED chip 1231 can be ultimately used as light that is transmitted through the transmitting portion 1232*a*. In other words, the light reflected at the reflecting portion 1232*b* is effectively used to increase the amount of light transmitted through the transmitting portion 1232*a* and ultimately to achieve a condition equivalent to the condition in which improved condenser efficiency, with which the condenser optical system 124 condenses the light emitted from the LED light source 123, is assured.

In addition to the advantages of the third embodiment, the following advantages are achieved through the fourth embodiment described above.

(1) Via a reflecting portion 1232*b* formed at the cover 1232 constituting part of the LED light source 123, the part of the light emitted from the LED chip 1231, which would not enter the condenser optical system 1234 is redirected to travel back to the LED chip 1231 to be effectively used. Namely, the light reflected at the reflecting portion 1231*b* enters the LED chip 1231 where it is repeatedly used to excite the phosphorescent substance, and is reflected before it exits the LED chip toward the condenser optical system 124. As a result, unlike the light emitted from the LED light source 223 in the related art shown in FIG. 12, which travels sideways from the LED chip 223*a* and thus cannot be effectively utilized, the light LA from the LED chip can be used effectively in the embodiment. Consequently, the light emitted from the LED light source 123 can be condensed more efficiently and ultimately, a greater amount of light can be output.

(2) The transmitting portion 1232*a* assuming a shape corresponding to that of the image display area 122A and the reflecting portion 1232*b* that reflects emitted light are formed at the outer circumferential surface of the cover 1232 of the LED light source 123. Via the reflecting portion 1232*b*, the part of the light emitted from the LED chip 1231, which would not enter the image display area 122A, is redirected to travel back to the LED chip 1231 from which it is subsequently emitted toward the image display area 122A. Namely, any lights that is not initially guided toward the image display area 122A is reflected in its entirety at the reflecting portion 1232*b* so that it can be effectively used. Through these measures, the light is utilized with a high level of efficiency and an increase in the amount of light entering the condenser optical system 124 from the LED light source 123 is achieved.

The projector unit 120 achieved in either the third embodiment or the fourth embodiment as described above allows for the following variations.

(1) The s-polarized light, instead of the p-polarized light reflected at the polarization splitter portion 126*a*, may be used for projection. In such a case, the projector unit 120 should assume a structure such as that shown in FIG. 18. The s-polarized light reflected at the polarization splitter portion 126*a* enters the reflective liquid crystal panel 122. At the reflective liquid crystal panel 122, the s-polarized light is modulated and is thus converted to p-polarized light to be used as projection light, which is then transmitted through the polarization splitter portion 126*a* and a polarizer 130S that absorbs s-polarized light before it is projected onto the screen via the projection optical system 121. By adopting the structure shown in FIG. 18, in which p-polarized light in the illuminating light is the polarized light component that is not effectively utilized in the related art, advantages similar to those of the structure shown in FIG. 15, in which s-polarized light in the illuminating light is the polarized light component not used effectively in the related art, can be achieved.

Figure 19:
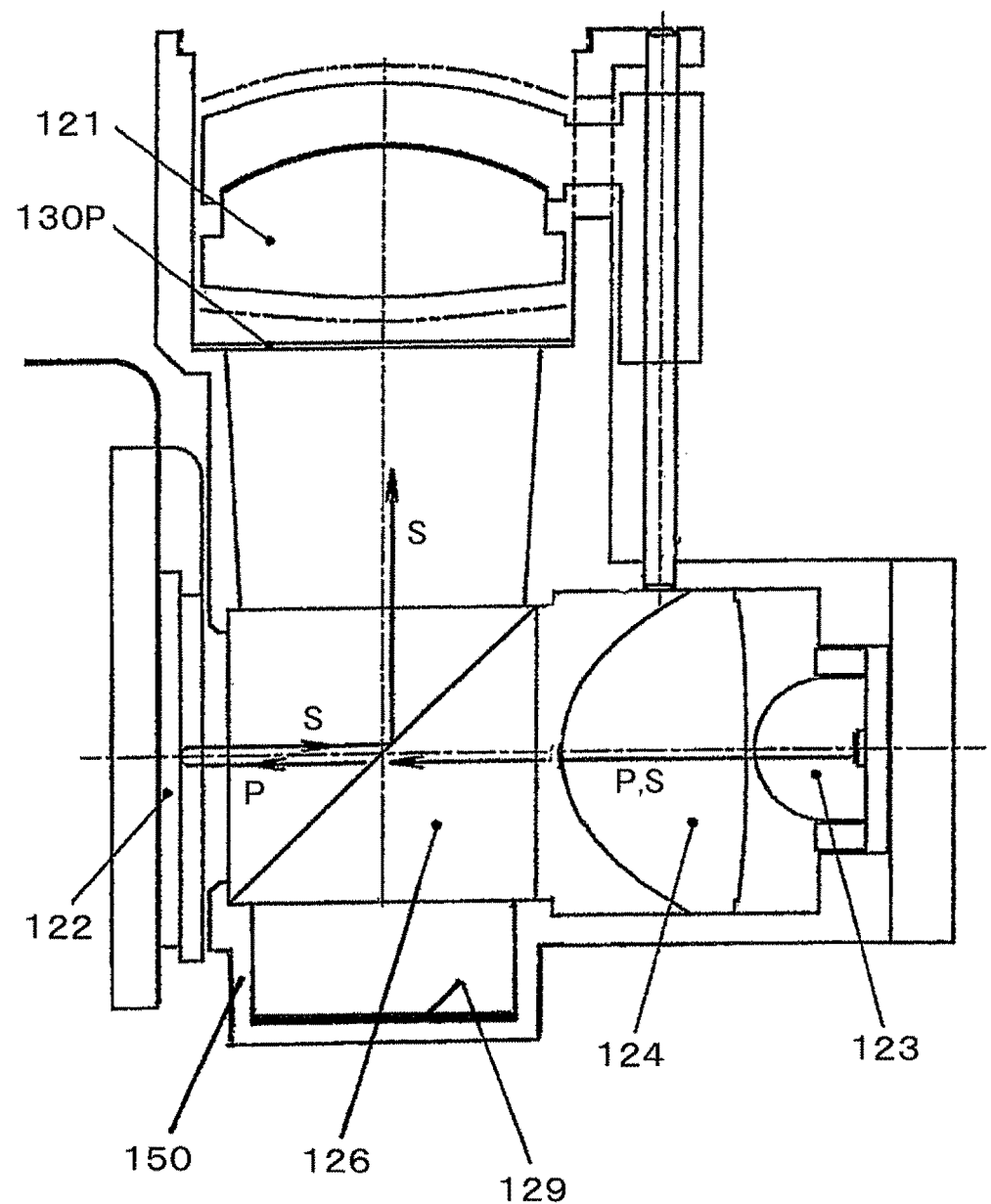

(2) The reflecting mirror 129 does not necessarily need to be a standalone unit. For instance, the LED light source 123, the condenser optical system 124, the PBS block 126, the reflective liquid crystal panel 122, the polarizer 130P and the projection optical system 121 may constitute an integrated unit housed in a case 150 with a reflecting mirror 129 formed by vapor-depositing a film onto an inner surface of the case 150, as shown in FIG. 19. The distance between such a reflecting mirror 129 and the PBS block 126 should be set to a length d, as detailed in the description of variation (3) below. Since the reflecting mirror 129 in variation (2) is constituted of a vapor-deposited film formed inside the inner surface of the case 150, the overall device can be provided as a more compact, lighter-weight unit through a reduction in the number of required parts.

Figure 20:
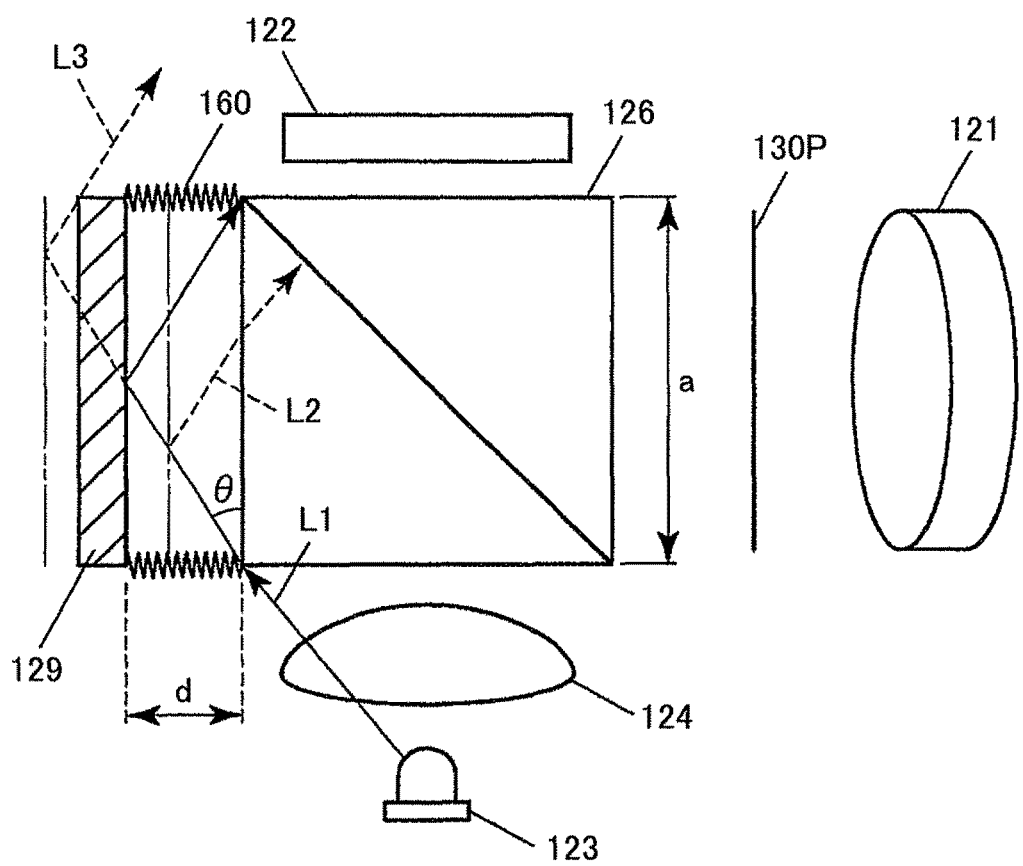

(3) FIG. 20 illustrates the third variation. As explained earlier, the condenser optical system 124 is an optical system via which the light emitted from the LED light source 123 is converted to parallel light. However, the light departing the condenser optical system is not perfectly parallel light; it contains rays of light failing to achieve the state of perfect parallelism. Since the light source is not an ideal point light source, a perfectly parallel state cannot easily be achieved while pursuing further miniaturization of the projector unit 120. Thus, the light departing the condenser optical system 124 includes a ray L1 that exits the condenser optical system 124 and enters the PBS block 126 along a diagonal direction.

The ray L1 is unsplit light, which, after exiting the condenser optical system 124 and entering the PBS block 126, departs the PBS block to travel toward the reflecting mirror without entering the polarization splitting surface 126*a*. In other words, it travels through the area located at the end of the PBS block 126 before exiting the PBS block to travel toward the reflecting mirror. As long as the distance d between the PBS block 126 and the reflecting mirror 129 is set so as to satisfy the relationship expressed in (1) below, the reflected light L1 is not allowed to reenter the PBS block 126 to adversely affect the projection image. θ represents the angle of the ray L1 relative to the exit surface of the PBS block 126, whereas a represents the length of a side of the PBS block 126.

$$d > (a/2) \cdot \tan \theta \quad (1)$$

The reflecting mirror 129 in FIG. 20 assumes a position at which the relationship expressed as; d=(a/2)·tan θ is satisfied, with the light L1 having been reflected at the reflecting mirror 129 then enters the upper end of the PBS block 126. When the distance d is smaller than (a/2)·tan θ, a ray L2 reenters the PBS block 126 to cause ghosting or the like. When the distance d is greater than (a/2)·tan θ, a ray L3 having been reflected at the reflecting mirror 129 does not reenter the PBS block 126.

It is to be noted that even when the distance d is set as expressed in (1), scattered light resulting from light leaking to the outside through the gap between the PBS block 126 and the reflecting mirror 129 as indicated by the ray L3 would become a problem. Accordingly, a light shielding member 160, such as that shown in FIG. 20, should be installed in order to prevent the occurrence of such scattered light.

Figure 21:
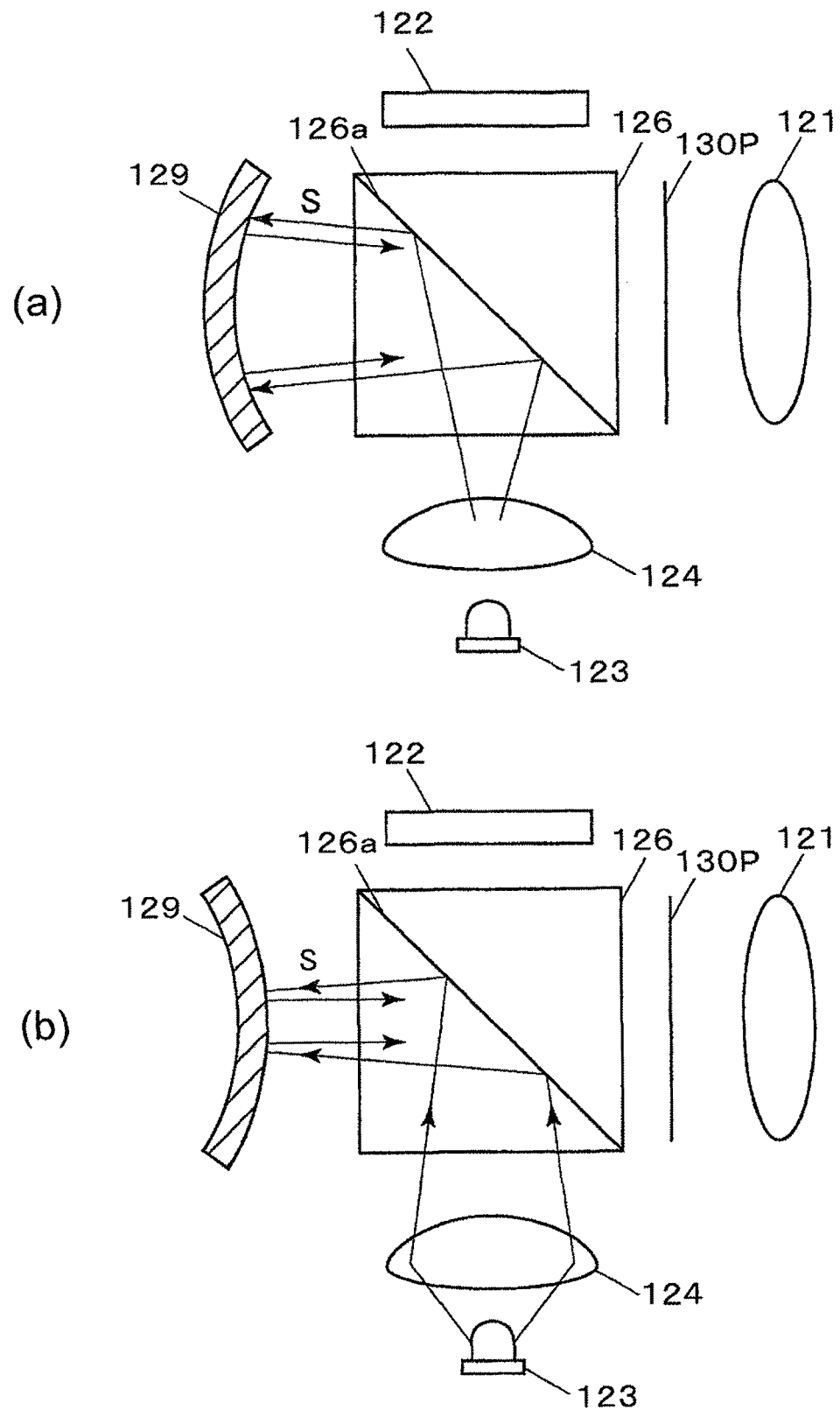

(4) FIG. 21 presents examples of a fourth variation to the third and fourth embodiment. As long as the light departing the condenser optical system 124 was completely parallel light, the s-polarized light reflected at the polarization splitter portion 126a would enter the reflecting mirror 129 perpendicular to the surface and the light reflected off the reflecting mirror would travel back through the optical path to return to the LED light source 123. However, as has been explained in reference to FIG. 20, the light exiting the condenser optical system 124 is not completely parallel light. Accordingly, any light flux not parallel to the optical axis intercept polarization splitter portion 126a on an angle deviating from 45° and s-polarized light assuming a greater angle relative to the optical axis, reflected at the polarization splitter portion 126a to enter the reflecting mirror 129, will enter the reflecting mirror 129 along a more acutely diagonal angle. As a result, the light will not be reflected to be allowed to travel back along the optical path and part of the reflected light will not return to the LED light source 123.

Accordingly, the reflecting mirror 129 achieved in variation (4) has a reflecting surface assuming a predetermined level of optical power so as to ensure that non-parallel s-polarized light will still enter the reflecting surface of the reflecting mirror 129 perpendicular. The contour of the surface of the reflecting mirror 129 is determined in correspondence to the optical characteristics of the condenser optical system 124. Namely, if the condenser optical system 124 assumes characteristics whereby the light exiting the condenser optical system spreads more widely as it advances further, the reflecting surface at the reflecting mirror 129 should assume a concave contour, as shown in FIG. 21(a). If the condenser optical system 124 assumes characteristics whereby the light exiting the condenser optical system narrows as it advances further, the reflecting surface at the reflecting mirror 129 should assume a convex contour, as shown in FIG. 21(b).

The reflecting mirror 129 in variation (4) described above assumes specific optical power so as to ensure that the s-polarized light exiting the PBS block 126 enters the reflecting mirror 129 perpendicular to the surface. As a result, the entire s-polarized light reflected at the reflecting mirror 129 is allowed to travel backward through the optical path to return to the LED light source 123. Consequently, a further improvement is achieved in the efficiency with which the s-polarized light, wasted in the related art, is utilized.

It is to be noted that while specific optical characteristics (power) are assumed at the reflecting mirror 129 so as to allow the reflected s-polarized light to travel back along the optical path in the variation described above, reflection characteristics whereby light is caused to converge further toward the center of the light source may be assumed in conjunction with a surface light source. Light allowed to enter the light source toward the center thereof tends to re-exit as light departing the center of the light source. As a result, the light having re-exited the light source and passed through the condenser optical system 124, is likely to achieve a state of better parallelism. In particular, a significant advantage can be achieved by directing the light emanating from the phosphorescent substance through re-excitation toward the center of the light source. In addition, the structure having been described in reference to variation (3) above can also be adopted in conjunction with the reflecting mirror 129 assuming the specific optical power, as described above.

Figure 22:
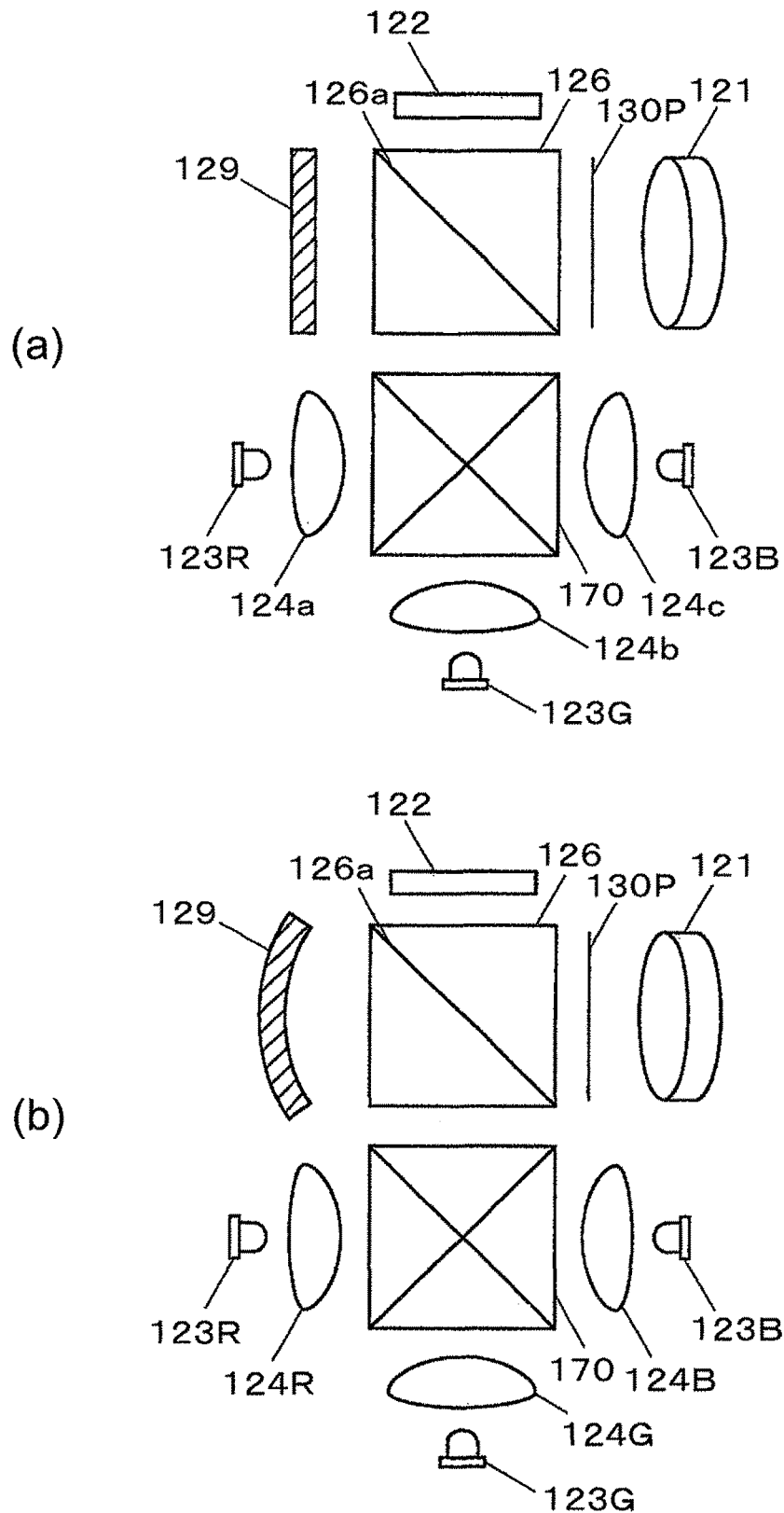

(5) FIG. 22 presents examples of a fifth variation of the embodiment. While the light source used in the embodiment is an LED light source 123 that emits white light, a light source achieved in variation (5) is constituted with three LEDs 123R, 123G and 123B, which are independent of one another and respectively generate R light, G light and B light, as shown in FIG. 22(a).

The reflecting mirror 129 in FIG. 22(a) is a plane mirror, whereas the reflecting mirror 129 in FIG. 22(b) is a concave mirror. In either case, the R light, G light and B light emitted from the LEDs 123R, 123G and 123B enter a cross dichroic prism 170 from three different directions respectively via condenser optical systems 124a, 124b and 124c. The R light, the G light and the B light having entered the cross dichroic prism 170 individually travel upward in the figure and enter the PBS block 126.

The R light, the G light and the B light are each split into s-polarized light and p-polarized light at the PBS block 126, and the p-polarized light in each color enters the reflective liquid crystal panel 122 whereas the s-polarized light in each color enters the reflecting mirror 129. The R-color s-polarized light, the G-color s-polarized light and the B-color s-polarized light are all reflected at the reflecting mirror 129, travel backward through the optical path and enter the cross dichroic prism 170. The R-color s-polarized light having entered the cross dichroic prism 170 exits the cross dichroic prism to travel toward the LED 123R, the G-color s-polarized light having entered the cross dichroic prism 170 exits the cross dichroic prism to travel toward the LED 123G and the B-color s-polarized light having entered the cross dichroic prism 170 exits the cross dichroic prism to travel toward the LED 123B. As a result, the light from the light source can be utilized with better efficiency and the brightness of the projection image can be improved as in the embodiment described above.

The power assumed for the reflecting mirror 129 can be determined in correspondence to all the condenser optical systems 124R, 124G and 124B as long as the three condenser optical systems 124R, 124G and 124B in the structure illustrated in FIG. 22(b) assume identical optical characteristics. However, if the optical characteristics of the individual condenser optical systems 124R, 124G and 124B do not match, the power at the reflecting mirror 129 should be set in correspondence to the optical characteristics of a specific condenser lens from which a greater amount of light needs to be output. For instance, the power may be adjusted in correspondence to the G light achieving the highest level of relative sensitivity so as to further improve the brightness of the projection image. As an alternative, that power may be set in correspondence to a condenser lens that outputs the least amount of light due to poor LED light emission efficiency, in order to achieve the optimal color balance for the projection image.

Figure 23:
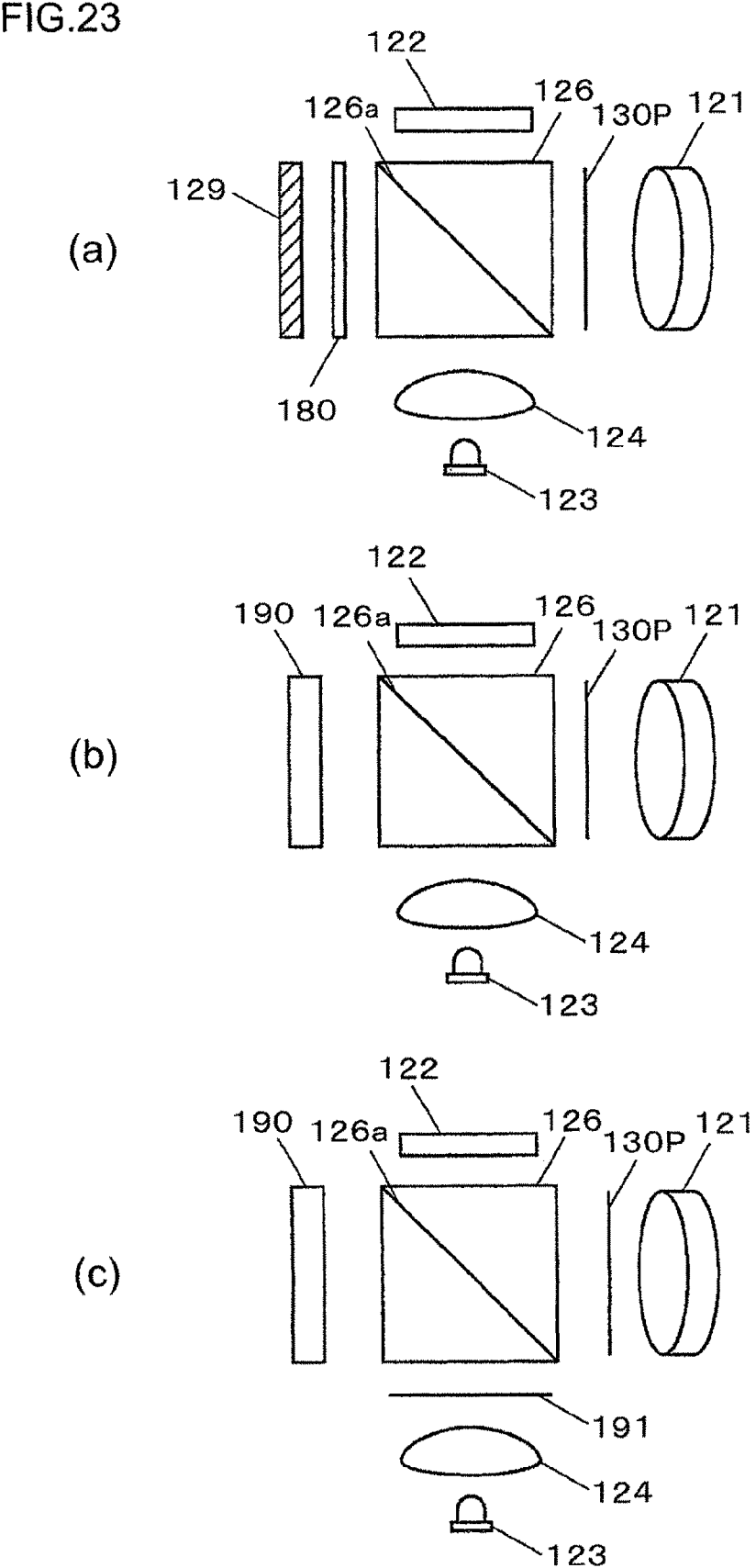

(6) FIG. 23 presents examples of a sixth variation to the third and fourth embodiments. The projector unit 120 having been described above in reference to FIG. 22(b) includes the three LEDs 123R, 123G and 123B installed independently of one another and by setting the power at the reflecting mirror 129 in correspondence to a specific color light, a brighter projection image can be provided or the optimal color balance can be achieved for the projection image. The projector unit 120 achieved in each example of variation (6) assumes a structure that allows similar advantages to be achieved in conjunction with an LED light source 123 such as that shown in FIG. 15, which emits white light.

In the example presented in FIG. 23(a), a color filter 180 is inserted between the reflecting mirror 129 and the PBS block 126 so as to achieve advantages similar to those of the example presented in FIG. 22(b). For instance, the color filter 180 may allow G light to be transmitted through and, in such a case, only the G-color s-polarized light will return to the LED light source 123, resulting in an increase in the G light to enter the reflective liquid crystal panel 122 and an improvement in the brightness of the projection image. The color filter 180 should allow a specific color light with a smaller output to be transmitted through to assure optimal color balance.

The structure illustrated in FIG. 23(b) includes a dichroic mirror 190 that exclusively reflects light in a predetermined wavelength range, in place of the reflecting mirror 129 and the color filter 180 in FIG. 23(a), so as to achieve similar advantages.

The structure illustrated in FIG. 23(c) is similar to that shown in FIG. 23(b), except that an additional member, i.e., a λ/4 wave plate 191, is disposed between the condenser optical system 124 and the PBS block 126. The frequency λ to be assumed for the λ/4 wave plate 191 is selected in correspondence to the wavelength of the specific color light to be reflected at the dichroic mirror 190. For instance, assuming that the dichroic mirror 190 is designed to reflect G light alone, the G-color s-polarized light having been reflected at the dichroic mirror 190 is reflected at the polarization splitter portion 126 and then is converted to elliptically polarized light via the λ/4 wave plate 191. As the G-color elliptically polarized light having been reflected at the LED light source 123, passes through the λ/4 wave plate 191 again, the G-color elliptically polarized light is converted to p-polarized light rotated by 90° relative to the s-polarized light.

This G-color p-polarized light is transmitted through the polarization splitter portion 126a at the PBS block 126 and then enters the reflective liquid crystal panel 122. In the structure that does not include the λ/4 wave plate 191, in which an increase in the amount of light is attempted by taking advantage of the polarized light rotation effect attributable to the reflection of the s-polarized light, only part of the returning s-polarized light is utilized to illuminate the reflective liquid crystal panel 122. In the structure that includes the λ/4 wave plate 191, on the other hand, the returning s-polarized light is caused to rotate via the λ/4 wave plate 191 to become p-polarized light, and thus, the efficiency with which the light from the light source is utilized is further improved over the structure in which the amount of light is increased through polarized light rotation attributable to the reflection alone. It is to be noted that similar advantages can be achieved in a structure in which s-polarized light is used when reading out the image at the reflective liquid crystal panel 122.

It is to be noted that specific power may be assumed at the reflecting mirror 129 or the dichroic mirror 190 in any of the structures illustrated in FIGS. 23(a)~23(c) to achieve advantages similar to those of the device shown in FIG. 21. It is also to be noted that in either of the structures illustrated in FIGS. 23(a) and 23(b), the distance between the PBS block 126 and the reflecting mirror 129 or the dichroic mirror 190 should be set greater than the distance d described earlier, in order to minimize the adverse effect of scattered light. In addition, the structures may also include a shielding member 160 such as that shown in FIG. 20.

(7) The reflecting portion 1232b at the LED light source 123 may be constituted with a dichroic mirror that reflects blue-color component light. In such a case, only the blue-color component light emitted from the LED chip 1231 and reflected at the dichroic mirror is allowed to enter the LED chip 1231. Thus, it can be ensured that the white light subsequently emitted from the LED light source contains less yellow-color component light compared to the white light emitted from an LED light source having received reflected light containing yellow-color component light.

Figure 24:
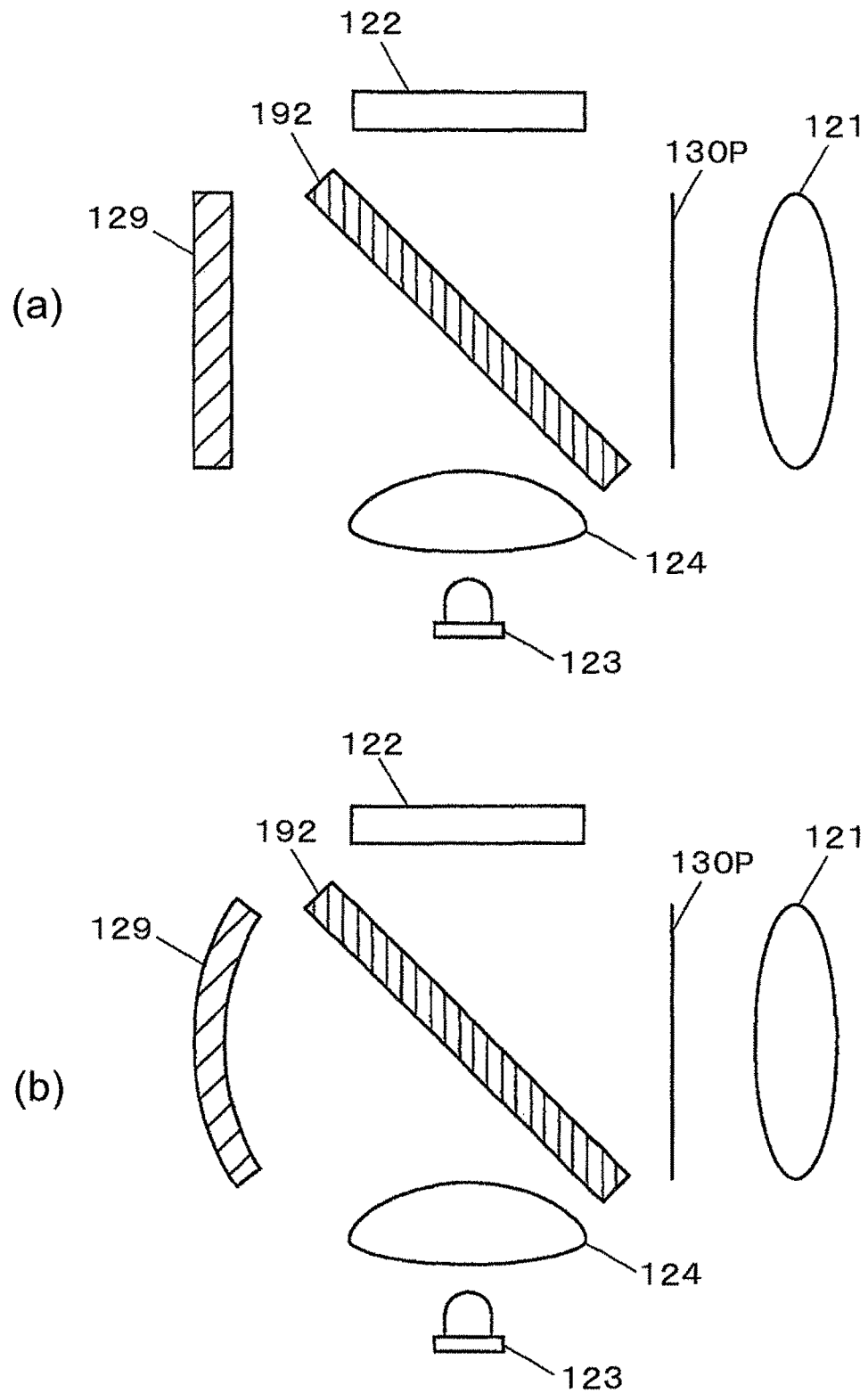

(8) While the light from the light source is split into two polarized light beams perpendicular to each other via the PBS block 126 in each of the embodiments described above, a flat optical element such as a wire grid polarizer or a birefringent reflective polarizer may be used instead. FIG. 24 shows structures that may be adopted in conjunction with a wire grid polarizer 192, with FIG. 24(a) showing a structure that includes a reflecting mirror 129 constituted with a plane mirror and FIG. 24(b) showing a structure that includes a reflecting mirror 129 assuming a specific power.

The projector unit 120 achieved in any of the first through fourth embodiments allows for the following variations.

(1) The present invention may be adopted in a portable electronic device such as a portable telephone or a PDA unit equipped with the projector unit 120.

(2) A solid-state light emitting element other than the light emitting diode described in reference to the embodiments may be used. In addition, the present invention may be adopted in conjunction with a light source constituted with a lamp.

Any of the embodiments described above may be adopted in combination with one of, or a plurality of variations described above, and any of the variations may be adopted in combination. In addition, as long as the features characterizing the present tension are not compromised, the present invention is not limited in any way whatsoever to the embodiments described above.

The disclosure of the following priority applications are herein incorporated by reference:
Japanese Patent Application No. 2008-011480 filed Jan. 22, 2008
Japanese Patent Application No. 2008-032057 filed Feb. 13, 2008
Japanese Patent Application No. 2008-159147 filed Jun. 18, 2008

The invention claimed is:
1. A projector, comprising:
a solid-state light emitting element that emits light;
a projection image forming unit that includes an effective area in order to form a projection image; and
a reflecting member disposed between the solid-state light emitting element and the projection image forming unit, wherein:
the solid-state light emitting element includes a light emitting portion which emits a first light, and a phosphorescent substance provided on the light emitting portion, which emits a second light that is a phosphorescent light excited by the first light and emanating from the phosphorescent substance, and emits both the first and the second light toward the effective area;
the reflecting member reflects part of the light emitted from the solid-state light emitting element and thus redirects the part of the light to travel back to the solid-state light emitting element, the part of the light not entering the effective area;
the projection image forming unit is a reflective image forming element that includes a polarization splitter element disposed at a front thereof;

the reflecting member is fixed on an entry surface of the polarization splitter element; and the first light among the part of the light reflected and redirected to the solid state light-emitting element by the reflecting member reenters the phosphorescent substance provided on the light-emitting element and excites the phosphorescent substance.

2. The projector according to claim 1, wherein:

the reflecting member includes an opening formed in a shape corresponding to a shape of the effective area; and the solid-state light emitting element emits the light toward the projection image forming unit via the opening.

3. The projector according to claim 1, wherein:

the reflecting member includes a first reflecting portion and a second reflecting portion which are set apart from each other over a predetermined distance corresponding to the effective area.

4. The projector according to claim 1, further comprising:

an illumination optical system disposed between the polarization splitter element and the solid-state light emitting element that converts the light emitted from the solid-state light emitting element to a substantially parallel light.

5. The projector according to claim 1, wherein:

the reflecting member has an optical power so as to ensure that the light reflected thereat returns to the light-emitting element through the same optical path as the light initially reached the reflecting member.

* * * * *